(12) United States Patent
Dong et al.

(10) Patent No.: US 9,118,064 B2
(45) Date of Patent: Aug. 25, 2015

(54) REDOX FLOW BATTERY

(75) Inventors: Yongrong Dong, Osaka (JP); Toshio Shigematsu, Osaka (JP); Takahiro Kumamoto, Osaka (JP); Michiru Kubata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 566 days.

(21) Appl. No.: 13/583,585

(22) PCT Filed: Mar. 8, 2011

(86) PCT No.: PCT/JP2011/055418
§ 371 (c)(1),
(2), (4) Date: Sep. 7, 2012

(87) PCT Pub. No.: WO2011/111717
PCT Pub. Date: Sep. 15, 2011

(65) Prior Publication Data
US 2013/0045400 A1    Feb. 21, 2013

(30) Foreign Application Priority Data

| Mar. 12, 2010 | (JP) | ................................. 2010-056441 |
| Mar. 12, 2010 | (JP) | ................................. 2010-056442 |
| Mar. 12, 2010 | (JP) | ................................. 2010-056443 |
| Sep. 10, 2010 | (JP) | ................................. 2010-203447 |
| Mar. 7, 2011 | (JP) | ................................. 2011-049692 |
| Mar. 7, 2011 | (JP) | ................................. 2011-049693 |

(51) Int. Cl.
*H01M 4/36* (2006.01)
*H01M 2/38* (2006.01)
(Continued)

(52) U.S. Cl.
CPC .......... *H01M 8/188* (2013.01); *H01M 8/04186* (2013.01); *H01M 2/40* (2013.01); *H01M 8/18* (2013.01); *H01M 8/184* (2013.01); *Y02E 60/528* (2013.01)

(58) Field of Classification Search
None
See application file for complete search history.

(56) References Cited

U.S. PATENT DOCUMENTS

| 4,362,791 | A | * | 12/1982 | Kaneko et al. ................. 429/101 |
| 2012/0045680 | A1 | | 2/2012 | Dong et al. |
| 2012/0115069 | A1 | | 5/2012 | Noack et al. |

FOREIGN PATENT DOCUMENTS

| CA | 222007 | 11/1996 |
| CA | 2220075 A1 | 11/1996 |

(Continued)

OTHER PUBLICATIONS

Chinese Office Action for corresponding Chinese Application No. 201180013668.4, issued Apr. 28, 2014, 12 pages.

(Continued)

*Primary Examiner* — Ula C Ruddock
*Assistant Examiner* — Matthew Van Oudenaren
(74) *Attorney, Agent, or Firm* — Ditthavong & Steiner, P.C.

(57) ABSTRACT

Provided are a redox flow battery (RF battery) in which a positive electrode electrolyte and a negative electrode electrolyte are supplied to a battery cell including a positive electrode, a negative electrode, and a membrane, to charge and discharge the battery, and a method of operating the RF battery. The positive electrode electrolyte contains a manganese ion, or both of a manganese ion and a titanium ion. The negative electrode electrolyte contains at least one type of metal ion selected from a titanium ion, a vanadium ion, a chromium ion, a zinc ion, and a tin ion. The RF battery can have a high electromotive force and can suppress generation of a precipitation of $MnO_2$ by containing a titanium ion in the positive electrode electrolyte, or by being operated such that the positive electrode electrolyte has an SOC of not more than 90%.

17 Claims, 13 Drawing Sheets

(51) Int. Cl.
*H01M 8/18* (2006.01)
*H01M 8/04* (2006.01)
*H01M 2/40* (2006.01)

(56) References Cited

FOREIGN PATENT DOCUMENTS

| CN | 101326672 A | 12/2008 |
| CN | 102341946 A | 2/2012 |
| JP | 57-009073 | 1/1982 |
| JP | 61-001270 | 1/1986 |
| JP | 61-001270 U | 1/1986 |
| JP | 02-079374 | 3/1990 |
| JP | 08-138718 | 5/1996 |
| JP | 2001-167786 | 6/2001 |
| JP | 2004-071165 | 3/2004 |
| JP | 2006-147374 | 6/2006 |
| TW | I368351 B | 7/2012 |
| WO | WO 2010/094657 A1 | 8/2010 |

OTHER PUBLICATIONS

International Search Report, International Application No. PCT/JP2011/055418, dated May 31, 2011.

Office Action for corresponding Taiwanese Application No. 100108300, dated Sep. 3, 2014, 8 pages.

* cited by examiner (I)

(II)

(I) ANION EXCHANGE MEMBRANE (II) CATION EXCHANGE MEMBRANE (Ⅰ) MANGANESE ION CONCENTRATION : 4M (Ⅱ) MANGANESE ION CONCENTRATION : 3M (Ⅲ) MANGANESE ION CONCENTRATION : 1.5M (Ⅰ) SULFURIC ACID CONCENTRATION : 2M (Ⅱ) SULFURIC ACID CONCENTRATION : 3M (Ⅲ) SULFURIC ACID CONCENTRATION : 4M (I) SULFURIC ACID CONCENTRATION : 1M (II) SULFURIC ACID CONCENTRATION : 2.5M (I) AMOUNTS OF POSITIVE AND NEGATIVE ELECTROLYTES : 6ml    CURRENT DENSITY : 50mA/cm$^2$ (II) AMOUNT OF POSITIVE ELECTROLYTE : 6ml    AMOUNT OF NEGATIVE ELECTROLYTE : 9ml
CURRENT DENSITY : 70mA/cm$^2$ (III) AMOUNT OF POSITIVE ELECTROLYTE : 6ml    AMOUNT OF NEGATIVE ELECTROLYTE : 9ml
CURRENT DENSITY : 50mA/cm$^2$

REDOX FLOW BATTERY

TECHNICAL FIELD

The present invention relates to a redox flow battery and a method of operating the same. More particularly, the present invention relates to a redox flow battery capable of generating a high electromotive force.

BACKGROUND ART

As a way to combat global warming, the introduction of new energy such as solar photovoltaic power generation and wind power generation has been promoted in recent years throughout the world. Since outputs of these power generations are affected by the weather, it is predicted that the introduction on a large scale will cause problems with operation of power systems such as difficulty in maintaining frequencies and voltages. As a way to solve such problems, the installation of large-capacity storage batteries for smoothing output variations, storing surplus power, and load leveling is expected.

A redox flow battery is one of large-capacity storage batteries. In a redox flow battery, a positive electrode electrolyte and a negative electrode electrolyte are supplied to a battery cell having a membrane interposed between a positive electrode and a negative electrode, to charge and discharge the battery. An aqueous solution containing a metal ion having a valence which changes by oxidation-reduction is representatively used as the electrolytes. Representative redox flow batteries include an iron-chromium-based redox flow battery containing an iron ion for a positive electrode and a chromium ion for a negative electrode, and a vanadium-based redox flow battery containing a vanadium ion for both of positive and negative electrodes (e.g., Patent Literature 1).

CITATION LIST

Patent Literature

PTL 1: Japanese Patent Laying-Open No. 2006-147374

SUMMARY OF INVENTION

Technical Problem

The vanadium-based redox flow battery has been commercialized, and its continued use is expected. It cannot be said, however, that the conventional iron-chromium-based redox flow battery and vanadium-based redox flow battery have a sufficiently high electromotive force. In order to meet future worldwide demand, it is desired to develop a new redox flow battery having a higher electromotive force and containing a metal ion used for an active material that can be supplied stably, and preferably can be supplied stably at low cost.

Therefore, an object of the present invention is to provide a redox flow battery capable of generating a high electromotive force. Another object of the present invention is to provide a method of operating a redox flow battery capable of maintaining a state where the battery has excellent battery properties.

Solution to Problem

One possible way to improve an electromotive force is to use a metal ion having a high standard oxidation-reduction potential for an active material. Metal ions $Fe^{2+}/Fe^{3+}$ and $V^{4+}/V^{5+}$ for a positive electrode active material used in a conventional redox flow battery have standard oxidation-reduction potentials of 0.77V and 1.0V, respectively. The present inventors studied a redox flow battery containing, as a metal ion for a positive electrode active material, manganese (Mn) which is a water-soluble metal ion, has a standard oxidation-reduction potential higher than those of conventional metal ions, is relatively less expensive than vanadium, and is also considered more preferable in terms of resource supply. $Mn^{2+}/Mn^{3+}$ has a standard oxidation-reduction potential of 1.51V, and a manganese ion has desirable properties for constituting a redox couple having a higher electromotive force.

When a manganese ion is used as a metal ion for a positive electrode active material, however, solid $MnO_2$ is precipitated during charge and discharge.

$Mn^{3+}$ is unstable, and produces $Mn^{2+}$ (divalent) and $MnO_2$ (tetravalent) through the following disproportionation reaction in a manganese ion aqueous solution.

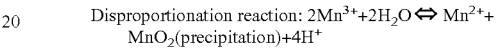

It is understood from the above expression of disproportionation reaction that precipitation of $MnO_2$ can be suppressed to some extent by reducing $H_2O$ relatively, e.g., by increasing concentration of an acid (e.g., sulfuric acid) in a solvent for an electrolyte when an acid aqueous solution such as a sulfuric acid aqueous solution is used as the solvent. Here, to obtain a practical redox flow battery as a large-capacity storage battery as discussed above, it is desirable that the manganese ion have a solubility of not less than 0.3M from the viewpoint of energy density. A manganese ion, however, has the property of decreasing in solubility as acid concentration (e.g., sulfuric acid concentration) increases. Namely, if the acid concentration is increased in order to suppress precipitation of $MnO_2$, concentration of the manganese ion in the electrolyte cannot be increased, resulting in lowered energy density. In addition, depending on a type of acid, increase in acid concentration may cause an increase in viscosity of an electrolyte, resulting in difficulty in use thereof.

The present inventors further studied a condition in which precipitation due to disproportionation reaction of Mn (trivalent) hardly occurs, reaction of $Mn^{2+}/Mn^{3+}$ takes place stably and a practical solubility is obtained, even when a manganese ion is used for a positive electrode active material. As a result, it has been found that (1) containing a specific metal ion in a positive electrode electrolyte, and (2) operating a battery such that the positive electrode electrolyte has a state of charge (SOC; also referred to as depth of charge) within a specific range, can be suitably utilized as means for suppressing the precipitation.

As to (1) above, while the precise mechanism is not clear, it has been found that the precipitation can be effectively suppressed by containing a manganese ion as well as a titanium ion in the positive electrode electrolyte. In particular, they have found a surprising fact that the precipitation is not substantially observed even when charge is performed with a high SOC of the positive electrode electrolyte such as an SOC of more than 90%, or even further not less than 130% when the SOC is calculated on the assumption that all of the reactions of manganese ions are one-electron reaction $(Mn^{2+} \rightarrow Mn^{3+}+e^-)$. Since the precipitation can be effectively suppressed by the coexistence of manganese ion and titanium ion, the manganese ion can have a solubility of a sufficiently practical value without making the acid concentration in the solvent unnecessarily high. They have also found a new fact that $MnO_2$ (tetravalent), which is considered to have been generated during charge with the SOC of not less than 100%, is not precipitated, but can be reduced to Mn (divalent) during discharge. From these findings, it is expected that the battery properties will be further improved by employing the suppression means (1) above.

As to (2) above, it has been found that the precipitation can be effectively suppressed by operating the battery such that the positive electrode electrolyte has an SOC of not more than 90%. Since the precipitation can be suppressed under this specific operating condition, the manganese ion can have a solubility of a sufficiently practical value without making the acid concentration in the solvent unnecessarily high. They have also found a new fact that under this specific operating condition, even if a small amount of $MnO_2$ is precipitated, $MnO_2$ (tetravalent) that has been precipitated during charge and discharge can be at least partially reduced to Mn (divalent).

It has been also found that Ti/Mn-based, V/Mn-based, Cr/Mn-based, Zn/Mn-based, and Sn/Mn-based redox flow batteries containing a manganese ion for a positive electrode active material, and containing at least one type of metal ion selected from a titanium ion, a vanadium ion, a chromium ion, a zinc ion, and a tin ion for a negative electrode active material can have a high electromotive force, and can operate well and stably with electrolytes in which the above metal ions were dissolved in high concentration. In particular, by using a manganese ion as a positive electrode active material, using an electrolyte containing a titanium ion as a positive electrode electrolyte, using a titanium ion as a negative electrode active material, and using an electrolyte containing a manganese ion as a negative electrode electrolyte, i.e., by equalizing the types of metal ions in the electrolytes of both electrodes with each other, particular effects can be attained. Namely, (1) a phenomenon in which the battery capacity decreases due to a relative reduction in the amount of metal ions that would originally react at each electrode resulting from the movement of the metal ions to a counter electrode can be effectively prevented, (2) even if liquid transfer (phenomenon in which an electrolyte of one electrode moves to the other electrode) occurs over time due to charge and discharge to cause variation in amount of electrolyte and ion concentration between both electrodes, the variation can be readily corrected by mixing the electrolytes of both electrodes with each other, and (3) high manufacturability of the electrolytes is attained. The present invention is based on these findings.

The present invention relates to a redox flow battery in which a positive electrode electrolyte and a negative electrode electrolyte are supplied to a battery cell including a positive electrode, a negative electrode, and a membrane interposed between the electrodes, to charge and discharge the battery. The positive electrode electrolyte contains a manganese ion, and the negative electrode electrolyte contains at least one type of metal ion selected from a titanium ion, a vanadium ion, a chromium ion, a zinc ion, and a tin ion. The redox flow battery includes precipitation suppression means for suppressing precipitation of $MnO_2$. The precipitation suppression means may be the following (1), (2), for example.

(1) As the precipitation suppression means, the positive electrode electrolyte contains a titanium ion.

(2) As the precipitation suppression means, the battery is operated such that the positive electrode electrolyte has an SOC of not more than 90% when calculated on the assumption of one-electron reaction.

Further, when the positive electrode electrolyte contains a titanium ion, the following embodiment (3) may be applied.

(3) Both of the positive electrode electrolyte and the negative electrode electrolyte contain both of a manganese ion and a titanium ion.

According to the above embodiments, it is expected that a high electromotive force equal to or higher than those of conventional redox flow batteries will be obtained, and that the active materials will be stably supplied by using a relatively inexpensive metal ion (manganese ion) at least as the positive electrode active material. In particular, according to the above embodiment (3), it is expected that both of the positive electrode active material and the negative electrode active material will be stably supplied.

Further, according to the above embodiments (1) and (3), the coexistence of the manganese ion and the titanium ion in the positive electrode electrolyte can prevent substantial precipitation of $MnO_2$ and allow stable reaction of $Mn^{2+}/Mn^{3+}$ while using the manganese ion as an active material, thereby attaining satisfactory charge and discharge operation. Moreover, any generated $MnO_2$ is not precipitated and can be used as the active material, thus attaining a higher battery capacity. Furthermore, according to the above embodiment (3), a battery capacity decrease due to movement of the metal ions to a counter electrode can be suppressed because the types of metal ions in the electrolytes of both electrodes are equal to each other, thereby ensuring a stable battery capacity over a long period of time.

According to the above embodiment (2), the specific operating condition can effectively suppress precipitation of $MnO_2$ while using the manganese ion. Thus, problems such as a decrease in amount of positive electrode active material due to precipitation of $MnO_2$ hardly occur, and reaction of $Mn^{2+}/Mn^{3+}$ can stably take place, thereby attaining satisfactory charge and discharge operation.

Further, according to the above embodiments which can suppress precipitation of $MnO_2$, the acid concentration in the solvent does not need to be excessively high, and so the solubility of the manganese ion in the positive electrode electrolyte can be increased, to attain a practical manganese ion concentration, thereby increasing energy density and battery capacity. Therefore, the redox flow battery according to the present invention is expected to be suitably used for smoothing output variations, storing surplus power, and load leveling of new energy.

In addition, according to the above embodiment (3), since the types of metal ions in the electrolytes of both electrodes are equal to each other, variation in amount of electrolyte and ion concentration due to liquid transfer can be readily corrected, and high manufacturability of the electrolytes is attained.

With regard to the above embodiment (2), operation is controlled such that the positive electrode electrolyte has an SOC of not more than 90% when the SOC is calculated on the assumption that all of the reactions of manganese ions are one-electron reaction ($Mn^{2+} \rightarrow Mn^{3+} + e^-$). It has been found that the lower the SOC, the more readily the precipitation of $MnO_2$ can be suppressed, and that $MnO_2$ is not substantially precipitated when the SOC is not more than 70%, as demonstrated in experimental examples to be described later. It is therefore preferable to control operation, representatively to adjust a switching voltage depending on a liquid composition of the electrolyte, such that the SOC is not more than 70% when calculated on the assumption of one-electron reaction.

In the present invention where a manganese ion is used, it is considered that one-electron reaction mainly occurs, and so the SOC is calculated on the assumption of one-electron reaction. However, not only one-electron reaction but also two-electron reaction ($Mn^{2+} \rightarrow Mn^{4+} + 2e^-$) may occur, and so the present invention allows two-electron reaction. When two-electron reaction occurs, the effect of increasing the energy density is attained.

In specific embodiments of the positive electrode electrolyte, the positive electrode electrolyte contains, when not containing a titanium ion, at least one type of manganese ion selected from a divalent manganese ion and a trivalent manganese ion, or the positive electrode electrolyte contains, when containing a titanium ion, at least one type of manganese ion selected from a divalent manganese ion and a trivalent manganese ion, and a tetravalent titanium ion. By containing one of the manganese ions described above, the divalent manganese ion ($Mn^{2+}$) exists during discharge and the trivalent manganese ion ($Mn^{3+}$) exists during charge, leading to existence of both manganese ions through repeated charge and discharge. The use of two manganese ions $Mn^{2+}$/$Mn^{3+}$ as the positive electrode active material provides a high standard oxidation-reduction potential, thus a redox flow battery having a high electromotive force can be realized. In the embodiment where the manganese ion as well as the tetravalent titanium ion exist, precipitation of $MnO_2$ can be suppressed without using the specific operating condition where the SOC is within the specific range described above. The tetravalent titanium ion can be contained in the electrolyte by dissolving sulfate ($Ti(SO_4)_2$, $TiOSO_4$) in the solvent for the electrolyte, for example, and representatively exists as $Ti^{4+}$. The tetravalent titanium ion may include $TiO^{2+}$ or the like. The titanium ion existing at the positive electrode mainly serves to suppress precipitation of $MnO_2$, and does not actively serve as an active material.

While the present invention suppresses precipitation of $MnO_2$ by using a titanium ion as described above, for example, it is considered that tetravalent manganese exists depending on an SOC during actual operation. Alternatively, while the present invention suppresses disproportionation reaction of Mn (trivalent) under the specific operating condition described above, for example, disproportionation reaction may occur, albeit only slightly, during actual operation. If the disproportionation reaction occurs, tetravalent manganese may exist. Namely, the present invention includes the following specific embodiments where tetravalent manganese is contained.

(1) An embodiment where the positive electrode electrolyte contains at least one type of manganese ion selected from a divalent manganese ion and a trivalent manganese ion, tetravalent manganese, and a tetravalent titanium ion.

(2) An embodiment where the positive electrode electrolyte contains at least one type of manganese ion selected from a divalent manganese ion and a trivalent manganese ion, and tetravalent manganese.

The tetravalent manganese described above is considered to be $MnO_2$, and this $MnO_2$ is considered to be not a solid precipitation but to exist in a stable state in which the $MnO_2$ seems to have been dissolved in the electrolyte. This $MnO_2$ floating in the electrolyte can be used repeatedly by being reduced to $Mn^{2+}$ (discharged) through two-electron reaction during discharge, namely, by serving as an active material, to contribute to an increase in battery capacity. Accordingly, the present invention allows existence of tetravalent manganese.

On the other hand, the negative electrode electrolyte may contain a single type of metal ion selected from a titanium ion, a vanadium ion, a chromium ion, a zinc ion, and a tin ion, or may contain a plurality types of these listed metal ions. Each of these metal ions is water-soluble, and readily used since an electrolyte is obtained as an aqueous solution. By using such metal ions as the negative electrode active material and the manganese ion as the positive electrode active material, a redox flow battery having a high electromotive force can be obtained.

In the embodiment where the negative electrode electrolyte contains a single type of metal ion selected from the above metal ions, a titanium-manganese-based redox flow battery containing a titanium ion as a negative electrode active material generates an electromotive force of about 1.4V. It has been surprisingly found that, even in an embodiment where the positive electrode electrolyte does not contain a titanium ion at the start of operation, if a titanium ion is contained in the negative electrode electrolyte and mixed into the positive electrode electrolyte to some extent due to liquid transfer over time as a result of repeated charge and discharge, precipitation of $MnO_2$ can be suppressed while the precise mechanism is not clear. It has also been surprisingly found that, when a titanium ion exists in the positive electrode electrolyte, any generated $MnO_2$ is not precipitated but stably exists in the electrolyte to allow charge and discharge. Thus, since precipitation of $MnO_2$ can be suppressed and $Mn^{3+}$ can be stabilized to allow sufficient charge and discharge in this manner, it is preferable to use a titanium ion as the negative electrode active material.

Particularly, in an embodiment where the positive electrode electrolyte contains a manganese ion as well as a titanium ion serving as the active materials and the negative electrode electrolyte contains a titanium ion serving as the active material from the start of operation, the types of metal ions existing in the electrolytes of both electrodes overlap, and so disadvantages due to liquid transfer hardly occur. On the other hand, in an embodiment where the positive electrode electrolyte does not contain a titanium ion and a titanium ion is used as the negative electrode active material from the start of operation, it is preferable to actively suppress precipitation of $MnO_2$ under the specific operating condition as described above, since liquid transfer is not essentially a preferable phenomenon.

In the embodiments where the negative electrode electrolyte contains a single type of metal ion selected from the above metal ions, a vanadium-manganese-based redox flow battery containing a vanadium ion can have an electromotive force of about 1.8V, a chromium-manganese-based redox flow battery containing a chromium ion can have an electromotive force of about 1.9V, and a zinc-manganese-based redox flow battery containing a zinc ion can have a higher electromotive force of about 2.2V. A tin-manganese-based redox flow battery containing a tin ion can have an electromotive force of about 1.4V, which is similar to an electromotive force of a titanium-manganese-based redox flow battery.

The embodiments where the negative electrode electrolyte contains a single type of metal ion selected from the above metal ions include embodiments where the negative electrode electrolyte satisfies any one of the following (1) to (5):

(1) containing at least one type of titanium ion selected from a trivalent titanium ion and a tetravalent titanium ion;

(2) containing at least one type of vanadium ion selected from a divalent vanadium ion and a trivalent vanadium ion;

(3) containing at least one type of chromium ion selected from a divalent chromium ion and a trivalent chromium ion;

(4) containing a divalent zinc ion; and (5) containing at least one type of tin ion selected from a divalent tin ion and a tetravalent tin ion.

If the above (1) is satisfied, by containing one of the titanium ions described above, a tetravalent titanium ion (such as $Ti^{4+}$, $TiO^{2+}$) exists during discharge and a trivalent titanium ion ($Ti^{3+}$) exists during charge, leading to existence of both titanium ions through repeated charge and discharge. A divalent titanium ion may also exist. In this embodiment, therefore, the negative electrode electrolyte may contain at least one type of titanium ion selected from a divalent titanium ion, a trivalent titanium ion, and a tetravalent titanium ion.

If the above (2) is satisfied, by containing one of the vanadium ions described above, a trivalent vanadium ion ($V^{3+}$) exists during discharge and a divalent vanadium ion ($V^{2+}$) exists during charge, leading to existence of both vanadium ions through repeated charge and discharge. If the above (3) is satisfied, by containing one of the chromium ions described above, a trivalent chromium ion ($Cr^{3+}$) exists during discharge and a divalent chromium ion ($Cr^{2+}$) exists during charge, leading to existence of both chromium ions through repeated charge and discharge. If the above (4) is satisfied, by containing the divalent zinc ion, a divalent zinc ion ($Zn^{2+}$) exists during discharge and metal zinc (Zn) exists during charge, leading to existence of the divalent zinc ion through repeated charge and discharge. If the above (5) is satisfied, by containing one of the tin ions described above, a tetravalent tin ion ($Sn^{4+}$) exists during discharge and a divalent tin ion ($Sn^{2+}$) exists during charge, leading to existence of both tin ions through repeated charge and discharge.

If the negative electrode electrolyte contains a plurality types of metal ions, it is preferable to combine the metal ions in consideration of a standard oxidation-reduction potential of each metal, such that each metal ion is successively involved in battery reaction with an increase in voltage during charge. In accordance with the order of nobleness of potential, $Ti^{3+}/Ti^{4+}$, $V^{2+}/V^{3+}$ and $Cr^{2+}/Cr^{3+}$ are combined and contained in a preferred embodiment. In addition, the negative electrode can also contain a manganese ion, and the negative electrode electrolyte can contain a titanium ion and a manganese ion, or a chromium ion and a manganese ion, for example. The manganese ion contained in the negative electrode electrolyte is not to function as an active material, but to mainly cause overlap of the types of metal ions in the electrolytes of both electrodes. More specifically, if the negative electrode active material contains a titanium ion, and contains a manganese ion to overlap or be equal to a type of metal ion in the positive electrode electrolyte, for example, the negative electrode electrolyte may contain at least one type of titanium ion selected from a trivalent titanium ion and a tetravalent titanium ion, and a divalent manganese ion, or may contain at least one type of titanium ion selected from a divalent titanium ion, a trivalent titanium ion, and a tetravalent titanium ion, and a divalent manganese ion. The positive electrode electrolyte may also contain, in addition to the manganese ion serving as the positive electrode active material, a metal ion which does not substantially function as an active material such as the aforementioned titanium ion. For example, the negative electrode electrolyte may contain a chromium ion and a manganese ion (representatively a divalent manganese ion), and the positive electrode electrolyte may contain, in addition to the aforementioned manganese ion and titanium ion, a chromium ion (representatively a trivalent chromium ion). When the types of metal ions in the electrolytes of both electrodes overlap or become equal to each other in this manner, the following effects can be attained. Namely, (1) a phenomenon in which the battery capacity decreases due to a reduction in the amount of metal ions that would originally react as an active material at each electrode resulting from relative movement of the metal ions at each electrode to a counter electrode due to liquid transfer can be suppressed, (2) even if the amounts of electrolytes become unbalanced due to liquid transfer, the unbalanced amounts can be readily corrected, and (3) high manufacturability of the electrolytes is attained.

In an embodiment of the redox flow battery of the present invention in which the positive electrode electrolyte contains a titanium ion, a concentration of the titanium ion in the positive electrode electrolyte is not less than 50% of a concentration of the manganese ion in the positive electrode electrolyte.

Studies by the present inventors have found that, as demonstrated in experimental examples to be described later, energy density and an electromotive force can be increased with an increase in ratio of concentration of the titanium ion to the manganese ion used as the positive electrode active materials in the positive electrode electrolyte, namely, positive electrode Ti/positive electrode Mn. Specifically, the energy density and the like can be improved by setting the positive electrode Ti/positive electrode Mn to not less than 50%. The reason for this is considered that the titanium ion concentration at the positive electrode is relatively increased when the positive electrode Ti/positive electrode Mn falls within the above range, thereby effectively suppressing generation of a precipitation (solid) of $MnO_2$, and two-electron reaction including the reaction of trivalent→tetravalent can occur during charge on the manganese ion at the positive electrode in addition to the one-electron reaction of divalent→trivalent, thereby attaining an energy density which is about 1.5 times higher than that when only the one-electron reaction occurs. The energy density and the like can be increased with an increase in the above ratio of ion concentration, namely, the positive electrode Ti/positive electrode Mn. When the positive electrode Ti/positive electrode Mn is not less than 80%, the energy density as well as the manganese electromotive force can be further increased. When the positive electrode Ti/positive electrode Mn is not less than 100%, namely, when the titanium ion concentration at the positive electrode is equal to or higher than the manganese ion concentration at the positive electrode, the manganese electromotive force can be maximized. While an upper limit to the above ratio of ion concentration, namely, the positive electrode Ti/positive electrode Mn is not particularly set, it is preferable that the concentrations of the manganese ion and the titanium ion fall within a specific range to be described later. When the battery is operated over a long period of time, each ion concentration may be monitored and adjusted as necessary.

In an embodiment of the redox flow battery of the present invention in which the positive electrode electrolyte contains a titanium ion, the negative electrode electrolyte contains a titanium ion, and a concentration of the titanium ion in the negative electrode electrolyte is equal to or higher than the concentration of the titanium ion in the positive electrode electrolyte.

The present inventors have found that energy density may decrease in a redox flow battery in which a positive electrode electrolyte contains a titanium ion, due to the diffusion of the titanium ion in the positive electrode electrolyte toward the negative electrode over time (the ion moves due to liquid transfer) to lower the titanium ion concentration at the positive electrode, resulting in difficulty in suppressing generation of a precipitation (solid) of $MnO_2$, and the like. It is thus proposed to employ a titanium ion as the negative electrode active material, and to set the titanium ion concentration in the negative electrode electrolyte to be equal to or higher than the concentration in the positive electrode electrolyte. When the titanium ion concentration at the negative electrode and the titanium ion concentration at the positive electrode are equal to each other, that is, when the ratio of concentration of the titanium ion at the negative electrode to the titanium ion at the positive electrode, namely, negative electrode Ti/positive electrode Ti is 100%, the titanium ion concentrations in both of the positive and negative electrode electrolytes are balanced with each other, thereby suppressing the diffusion of the titanium ion at the positive electrode toward the negative electrode. When the titanium ion concentration at the negative electrode is higher than the titanium ion concentration at the positive electrode, that is, when the negative electrode Ti/positive electrode Ti is higher than 100%, although the titanium ion at the negative electrode may diffuse toward the positive electrode, the titanium ion at the positive electrode increases in this case, thereby increasing the energy density and manganese electromotive force as described above. In the above embodiment, therefore, excellent battery properties such as a high energy density can be maintained over a long period of time. While an upper limit to the negative electrode Ti/positive electrode Ti is not particularly set, it is preferable that the ion concentrations of both electrodes fall within a specific range to be described later. When the battery is operated over a long period of time, each ion concentration may be monitored and adjusted as necessary.

In an embodiment of the redox flow battery of the present invention in which the positive electrode electrolyte contains a titanium ion, the membrane is an ion exchange membrane.

The present inventors have found that it is preferable to utilize an ion exchange membrane as the membrane, as another method of suppressing the diffusion of the titanium ion in the positive electrode electrolyte toward the negative electrode over time as described above. It is thus proposed to use an ion exchange membrane in the embodiment where the positive electrode electrolyte contains a titanium ion. In particular, this ion exchange membrane preferably has a low permeability of a titanium ion and a manganese ion. For example, such ion exchange membrane may be made of a copolymer of perfluorosulfonic acid and polytetrafluoroethylene (PTFE). Commercialized products may be utilized.

In an embodiment of the redox flow battery of the present invention in which the electrolytes of both electrodes contain a titanium ion and a manganese ion, concentrations of the manganese ion and the titanium ion in the positive electrode electrolyte and concentrations of the manganese ion and the titanium ion in the negative electrode electrolyte are equal to each other, respectively.

Studies by the present inventors have found that, in a redox flow battery in which the electrolytes of both electrodes contain a titanium ion and a manganese ion, when the positive electrode electrolyte has a manganese ion concentration higher than a manganese ion concentration in the negative electrode electrolyte, the manganese ion at the positive electrode may diffuse toward the negative electrode over time (the ion moves due to liquid transfer) to lower the manganese ion concentration at the positive electrode, namely, to reduce the positive electrode active material. It has also been found that, when the positive electrode electrolyte has a titanium ion concentration higher than a titanium ion concentration in the negative electrode electrolyte, the titanium ion at the positive electrode may also diffuse toward the negative electrode (the ion moves due to liquid transfer) to lower the titanium ion concentration in the positive electrode electrolyte, resulting in inability to sufficiently suppress generation of a precipitation (solid) of $MnO_2$. It has been found that, when the concentrations of the manganese ion and the titanium ion at the positive electrode are higher than the concentrations of the manganese ion and the titanium ion at the negative electrode as described above, the battery capacity and energy density are lowered. When the battery is operated for a long period of time, therefore, it is proposed to equalize the concentrations of the manganese ion and the titanium ion in the positive electrode electrolyte with the concentrations of the manganese ion and the titanium ion in the negative electrode electrolyte, respectively, namely, to use the same composition for the electrolytes of both electrodes. In such embodiment where the metal ion concentrations are equal to each other between the positive and negative electrodes, a decrease in battery capacity due to the movement of a metal ion to a counter electrode can be suppressed, and a state where the battery has excellent battery properties such as a high energy density can be maintained over a long period of time. Moreover, in this embodiment, high manufacturability of the electrolytes is attained since the electrolytes of both electrodes have the same composition, and liquid transfer if occurred can be readily corrected.

As a method of operating the redox flow battery of the present invention in which the electrolytes of both electrodes contain a titanium ion and a manganese ion, it is proposed to equalize concentrations of the manganese ion and the titanium ion in the positive electrode electrolyte with concentrations of the manganese ion and the titanium ion in the negative electrode electrolyte, respectively, by mixing the positive electrode electrolyte and the negative electrode electrolyte with each other.

When the concentrations of the manganese ion and the titanium ion in the electrolytes of both electrodes are different from each other before the start of operation, respectively, the ions may move over time to lower the battery capacity and energy density, as described above. When the battery is operated for a long period of time, therefore, by monitoring the concentrations and equalizing the concentrations of the manganese ion and the titanium ion in the electrolytes of both electrodes with each other at appropriate timing, the ion movement can be effectively prevented, and a state where the battery has excellent battery properties such as a high energy density can be maintained after the concentration adjustment. Examples of a method of equalizing the concentrations include separately preparing and adding a desirable ion, but mixing the electrolytes of both electrodes with each other can be performed most readily with excellent workability. In an embodiment where the concentrations of the manganese ion and the titanium ion are equalized with each other between the electrolytes of both electrodes before the start of operation, too, the concentrations can of course be monitored and adjusted at appropriate timing.

It is preferable that all of the metal ions contained in the electrolytes of both electrodes for serving as the active materials have a concentration of not less than 0.3M and not more than 5M ("M": molarity). Thus, in an embodiment of the redox flow battery of the present invention, the manganese ion in the positive electrode electrolyte and the metal ions in the negative electrode electrolyte all have a concentration of not less than 0.3M and not more than 5M. In addition, it is preferable that the metal ions contained in the electrolytes of both electrodes mainly to cause overlap of the types of metal ions also have a concentration of not less than 0.3M and not more than 5M. For example, if the positive electrode electrolyte contains a titanium ion, both of the manganese ion and the titanium ion in the positive electrode electrolyte may have a concentration of not less than 0.3M and not more than 5M. For example, if both of the positive and negative electrode electrolytes contain both a manganese ion and a titanium ion, both of the manganese ion and the titanium ion may have a concentration of not less than 0.3M and not more than 5M.

If the metal ions serving as the active materials of both electrodes have a concentration of less than 0.3M, it is difficult to ensure a sufficient energy density (e.g., about 10 kWh/$m^3$, preferably higher) as a large-capacity storage battery. In order to increase the energy density, it is preferable for the metal ions to have a high concentration, and more preferably a concentration of not less than 0.5M, and further not less than 1.0M. In an embodiment where the positive electrode electrolyte contains a titanium ion, even if the manganese ion in the positive electrode electrolyte has a very high concentration of not less than 0.5M, or not less than 1.0M, Mn (trivalent) is stable and precipitation can be suppressed, thereby attaining satisfactory charge and discharge. If an acid aqueous solution is used as the solvent for the electrolyte, however, an increase in acid concentration to some text can suppress precipitation of $MnO_2$ as discussed above, but results in lower solubility of the metal ions due to the increase in acid concentration, which in turn results in lower energy density. Thus, a maximum concentration of the metal ions is considered to be 5M. In an embodiment where a titanium ion exists in the positive electrode electrolyte, the titanium ion which does not actively function as the positive electrode active material can sufficiently suppress precipitation of $MnO_2$ by having a concentration of 0.3M to 5M, and thus acid concentration can be increased to some extent when an acid aqueous solution is used as the solvent for the positive electrode electrolyte as described above. In particular, by equalizing the types and concentrations of the metal ions of the positive and negative electrodes with each other, the battery capacity decrease due to movement of the metal ions to a counter electrode and liquid transfer can be readily corrected.

In an embodiment of the redox flow battery of the present invention, each solvent for the electrolytes of both electrodes is an aqueous solution of at least one species selected from $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$, and $NaNO_3$.

All of the metal ions mentioned above, namely, the metal ions serving as the active materials of both electrodes, the metal ions for suppressing precipitation, and the metal ions not actively functioning as the active materials are water-soluble ions, and so an aqueous solution can be suitably used as the solvents for the electrolytes of both electrodes. In particular, when the aqueous solution contains at least one type of sulfuric acid, phosphoric acid, nitric acid, sulfate, phosphate, and nitrate as mentioned above, a plurality of effects are expected to be attained. Namely, (1) improved stability, reactivity and solubility of the metal ions may be obtained, (2) side reaction hardly occurs (decomposition hardly occurs) even when a metal ion having a high potential such as Mn is used, (3) ion conductivity is increased and internal resistance of the battery is reduced, and (4) unlike when hydrochloric acid (HCl) is used, chlorine gas is not generated. The electrolyte in this embodiment contains at least one of sulfate anion ($SO_4^{2-}$), phosphate anion (representatively $PO_4^{3-}$), and nitrate anion ($NO_3^-$). If the concentration of the acid in the electrolyte is too high, however, the solubility of the manganese ion or the like may decrease and the viscosity of the electrolyte may increase. It is thus considered preferable that the acid have a concentration of less than 5M.

In an embodiment of the redox flow battery of the present invention, both electrolytes contain a sulfate anion ($SO_4^{2-}$). Here, it is preferable that both electrolytes have a sulfuric acid concentration of less than 5M.

The embodiment where both electrolytes contain a sulfate anion ($SO_4^{2-}$) is preferable compared to the cases where the electrolytes contain a phosphate anion or a nitrate anion as described above, because the stability and reactivity of the metal ions serving as the active materials of both electrodes, the stability of the metal ions for suppressing precipitation, and the stability of the metal ions not actively functioning as the active materials, which are contained for the purpose of equalizing the types of metal ions of both electrodes with each other, are improved. For both electrolytes to contain a sulfate anion, a sulfate salt containing the above metal ions may be used, for example. Further, by using a sulfuric acid aqueous solution as a solvent for the electrolyte in addition to the use of sulfate, the stability and reactivity of the metal ions can be improved, side reaction can be suppressed, and the internal resistance can be reduced, as discussed above. If the sulfuric acid concentration is too high, however, the solubility decreases as discussed above due to the existence of sulfuric acid ions. It is thus preferable that the sulfuric acid concentration be less than 5M, 1M to 4M for easy use, and more preferably 1M to 3M.

In an embodiment where the electrolytes of both electrodes contain a titanium ion, a manganese ion and a sulfate anion, both electrolytes have a sulfuric acid concentration of not less than 1M and not more than 3M, a manganese ion concentration of not less than 0.5M and not more than 1.5M, and a titanium ion concentration of not less than 0.5M and not more than 1.5M.

If an aqueous solution is used as an electrolyte, energy density tends to be lower than when an organic solvent is used. Thus, when a redox flow battery system using an aqueous solution as an electrolyte is constructed, tanks storing the electrolytes of both electrodes occupy a large volume. To reduce the size of the system, it is preferable to increase the energy densities of the electrolytes. Examples of a method of increasing the energy density include increasing the solubility of a desired ion to a sufficient degree. For example, the sulfuric acid concentration in the sulfuric acid aqueous solution used as the solvent as described above may be reduced to some extent. Another property required of a battery is a low cell resistivity. The cell resistivity tends to be lower with an increase in sulfuric acid concentration, as demonstrated in experimental examples to be described later. Therefore, as a result of studying a redox flow battery satisfying the need for a high energy density and a low cell resistivity, it has been found that a sulfuric acid concentration is preferably 1M to 3M, and the concentration of a manganese ion and the concentration of a titanium ion in the electrolytes of both electrodes are preferably 0.5M to 1.5M. The sulfuric acid concentration is more preferably not less than 1.5M and not more than 2.5M, the concentration of the manganese ion in the electrolytes of both electrode is more preferably not less than 0.8M and not more than 1.2M, and the concentration of the titanium ion in the electrolytes of both electrodes is more preferably not less than 0.8M and not more than 1.2M. Since it is considered that a practically more preferable solubility is not less than 1M, the concentration of at least an ion serving as an active material in the electrolytes of both electrodes is more preferably not less than 1M.

In an embodiment of the redox flow battery of the present invention, the positive electrode and the negative electrode are made of at least one type of material selected from the following (1) to (10):

(1) a composite material including at least one type of metal selected from Ru, Ti, Ir, Mn, Pd, Au, and Pt, and an oxide of at least one type of metal selected from Ru, Ti, Ir, Mn, Pd, Au, and Pt (e.g., a Ti substrate with an Ir oxide or a Ru oxide applied thereon); (2) a carbon composite including the above composite material; (3) a dimensionally stable electrode (DSE) including the above composite material; (4) a conductive polymer (e.g., a polymer material that conducts electricity such as polyacetylene, polythiophene); (5) graphite; (6) glassy carbon; (7) conductive diamond; (8) conductive diamond-like carbon (DLC); (9) a nonwoven fabric made of carbon fiber; and (10) a woven fabric made of carbon fiber.

Here, if the electrolyte is an aqueous solution, since $Mn^{2+}/Mn^{3+}$ has a standard oxidation-reduction potential nobler than an oxygen generation potential (about 1.0V), oxygen gas may be generated during charge. In contrast, oxygen gas is hardly generated when an electrode formed of a nonwoven fabric made of carbon fiber (carbon felt) is used, for example, and oxygen gas is not substantially generated with some of electrodes made of conductive diamond. By selecting an electrode material as appropriate in this manner, generation of oxygen gas can also be effectively reduced or suppressed. In addition, the electrode formed of a nonwoven fabric made of carbon fiber has advantages of (1) having a large surface area, and (2) having excellent circulation of the electrolyte.

In an embodiment of the redox flow battery of the present invention, the membrane is at least one type of membrane selected from a porous membrane, a swellable membrane, a cation exchange membrane, and an anion exchange membrane. The swellable membrane refers to a membrane composed of a polymer (e.g., cellophane) which does not have a functional group and contains water. The ion exchange membranes have advantages of (1) attaining excellent isolation of the metal ions serving as the active materials of the positive and negative electrodes, and (2) having excellent permeability of $H^+$ ion (charge carrier inside a battery), and can be suitably used for the membrane. In particular, it is preferable that the ion exchange membrane have the effect of preventing the diffusion of a manganese ion and a titanium ion, as described above.

Advantageous Effects of Invention

The redox flow battery according to the present invention can generate a high electromotive force, and suppress generation of a precipitation. The method of operating a redox flow battery according to the present invention can maintain a state where the battery has excellent battery properties such as a high energy density over a long period of time.

DESCRIPTION OF EMBODIMENTS

Figure 1:
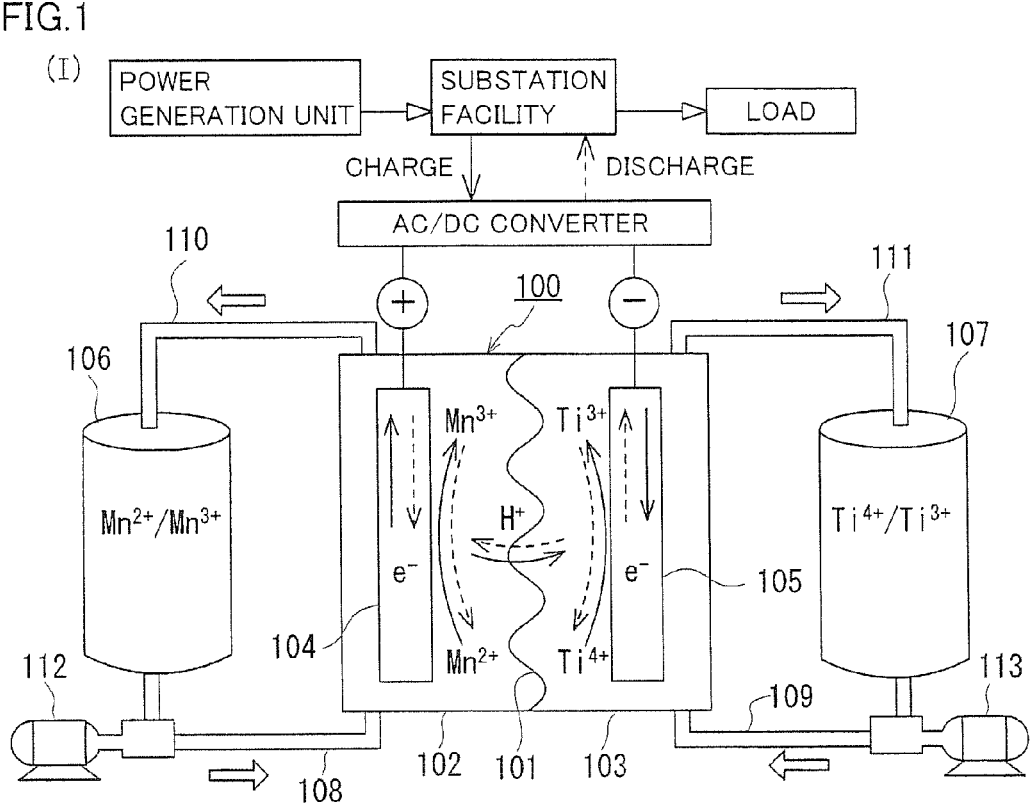
FIG. 1 (I) illustrates the operating principles of a battery system including a redox flow battery according to a first embodiment, and FIG. 1 (II) is a functional block diagram of the battery system further including control means.
Figure 1:
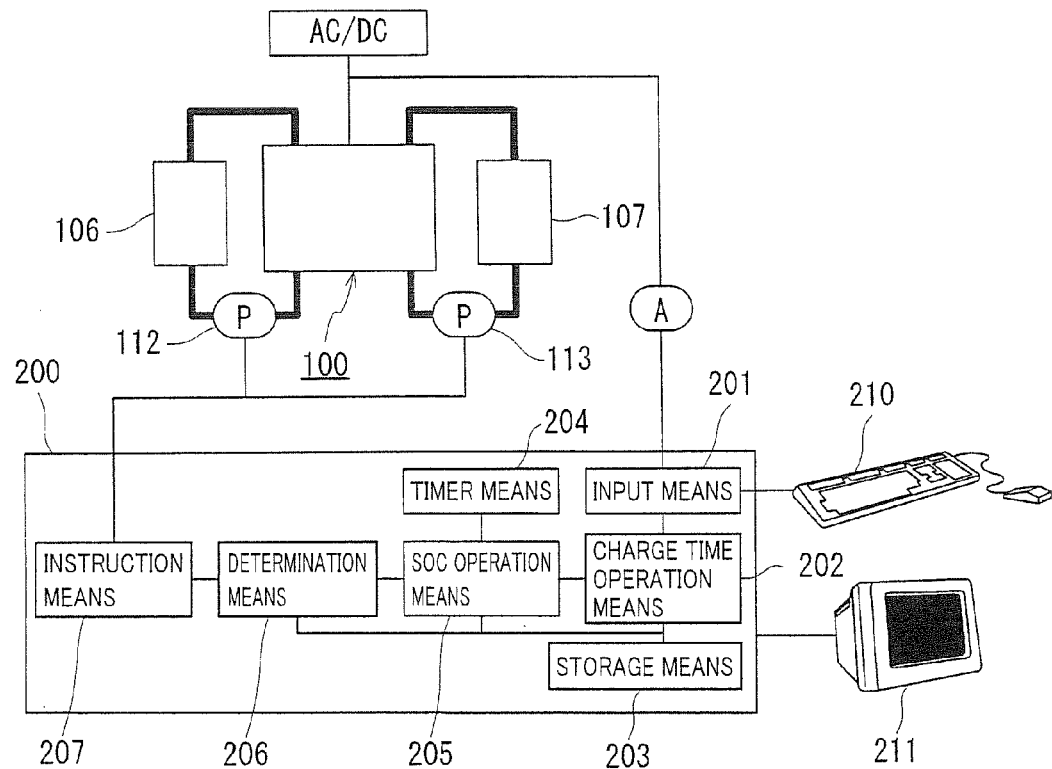
Figure 2:
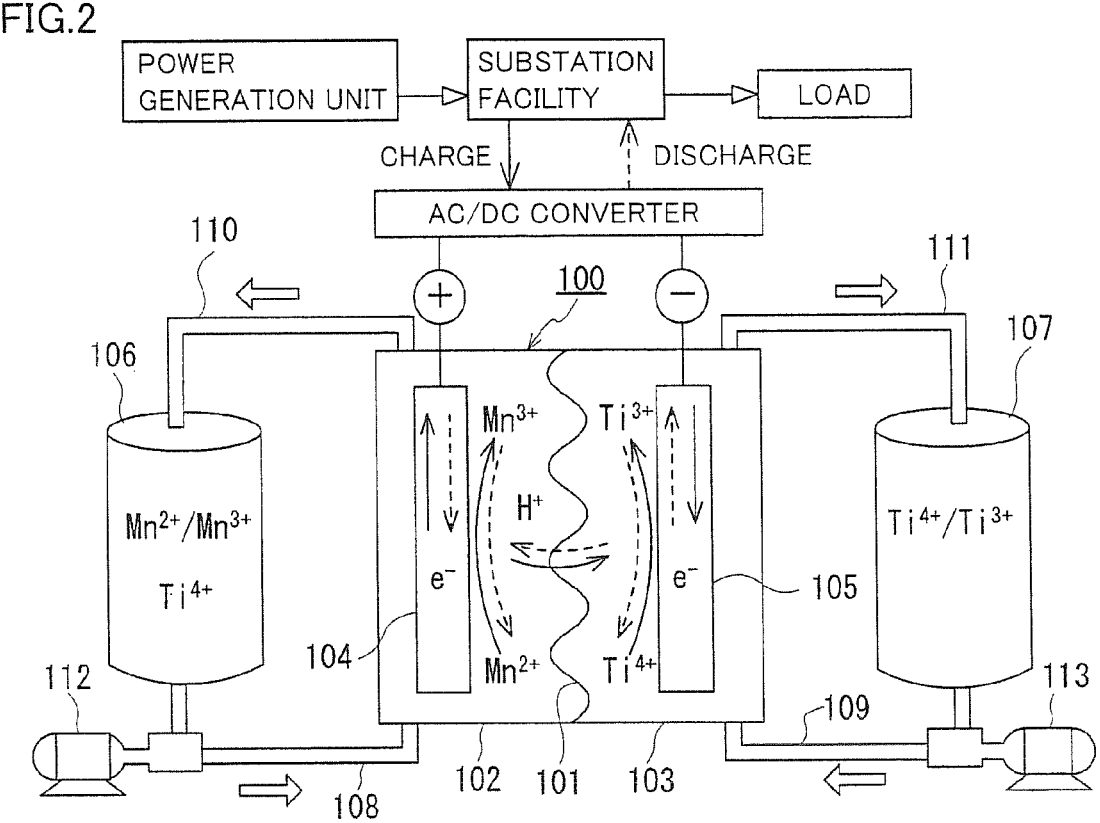
FIG. 2 illustrates the operating principles of a battery system including a redox flow battery according to a second embodiment.
Figure 3:
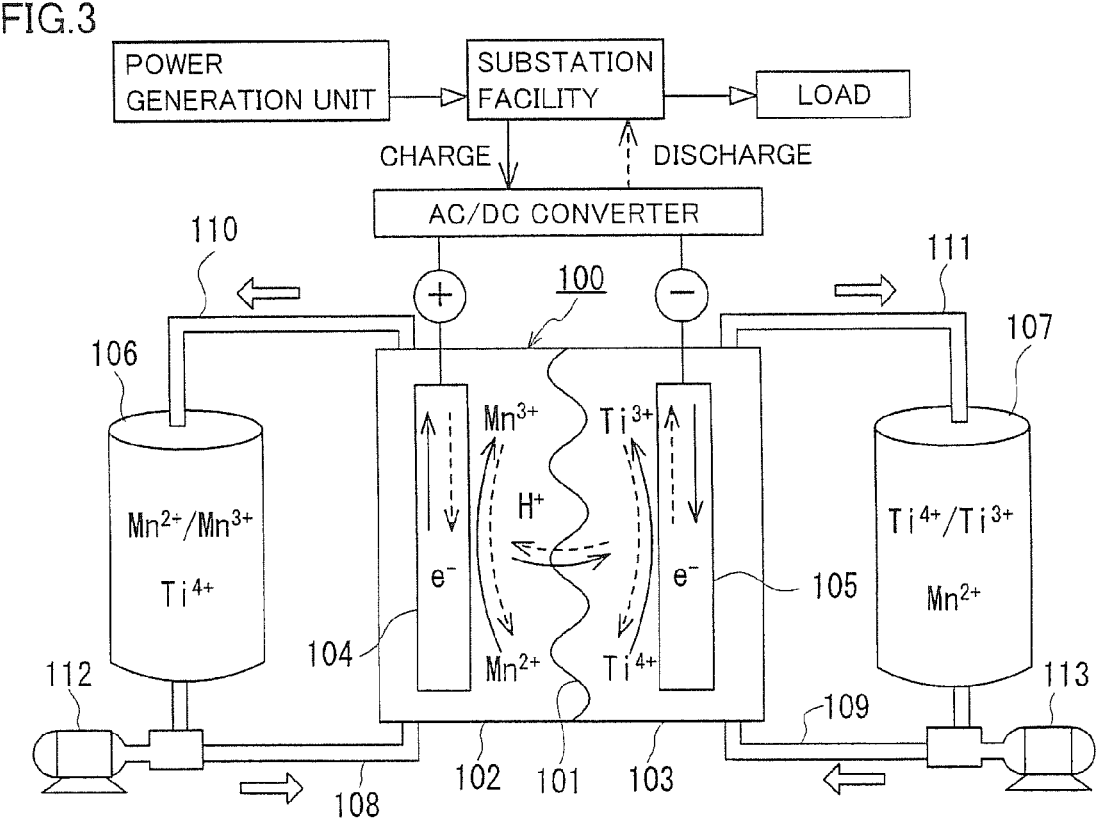
FIG. 3 illustrates the operating principles of a battery system including a redox flow battery according to a third embodiment.

Referring to FIGS. 1 to 3, battery systems including redox flow batteries in first to third embodiments will be generally described. FIGS. 1 (I) and 2 show illustrative ion types. In FIGS. 1 to 3, the same reference signs indicate components of the same names. In FIGS. 1 to 3, solid line arrows indicate charge, and broken line arrows indicate discharge. Further, FIGS. 1 to 3 illustrate metal ions in their representative forms, and forms other than those illustrated may be included. For example, while FIGS. 1 (I), 2 and 3 show $Ti^{4+}$ as a tetravalent titanium ion, another form of a tetravalent titanium ion such as $TiO^{2+}$ may be included.

Redox flow batteries 100 in the first to third embodiments basically have similar structures, which are first described with reference to FIGS. 1 (I), 2 and 3. Redox flow battery 100 is representatively connected via an AC/DC converter to a power generation unit (e.g., a solar photovoltaic power generator, a wind power generator, or a common power plant) and to a load such as a power system or a consumer, charged with the power generation unit as a power supply source, and discharged to provide power to the load. To be charged and discharged, the following battery system including redox flow battery 100 and a circulation mechanism (tanks, ducts, pumps) for circulating an electrolyte through battery 100 is constructed.

Redox flow battery 100 includes a positive electrode cell 102 having a positive electrode 104 therein, a negative electrode cell 103 having a negative electrode 105 therein, and a membrane 101 separating cells 102 and 103 from each other, through which ions permeate as appropriate. Positive electrode cell 102 is connected to a tank 106 for a positive electrode electrolyte through ducts 108, 110. Negative electrode cell 103 is connected to a tank 107 for a negative electrode electrolyte through ducts 109, 111. Ducts 108, 109 include pumps 112, 113 for circulating the electrolytes of the electrodes, respectively. In redox flow battery 100, the positive electrode electrolyte in tank 106 and the negative electrode electrolyte in tank 107 are supplied to positive electrode cell 102 (positive electrode 104) and negative electrode cell 103 (negative electrode 105) by circulation, respectively, through ducts 108 to 111 and pumps 112, 113, to charge and discharge the battery through valence change reaction of metal ions serving as active materials in the electrolytes of both electrodes.

Redox flow battery 100 representatively has a form referred to as a cell stack, which includes a plurality of cells 102, 103 stacked therein. Cells 102, 103 are representatively structured with a cell frame including a bipolar plate (not shown) having positive electrode 104 arranged on one surface and negative electrode 105 on the other surface, and a frame (not shown) having a liquid supply hole for supplying the electrolytes and a liquid drainage hole for draining the electrolytes, and formed on the periphery of the bipolar plate. By stacking a plurality of cell frames, the liquid supply holes and the liquid drainage holes form a fluid path for the electrolytes, which is connected to ducts 108 to 111 as appropriate. The cell stack is structured by successively and repeatedly stacking the cell frame, positive electrode 104, membrane 101, negative electrode 105, the cell frame . . . . A known structure may be used as appropriate as a basic structure of the redox flow battery system.

Particularly, in the redox flow battery in the first embodiment, the positive electrode electrolyte contains a manganese ion, and the negative electrode electrolyte contains at least one type of metal ion selected from a titanium ion, a vanadium ion, a chromium ion, a zinc ion, and a tin ion (a titanium ion is shown as an example in FIG. 1 (I)). Redox flow battery 100 in the first embodiment uses the manganese ion as the positive electrode active material and the metal ion mentioned above as the negative electrode active material, and is operated such that the positive electrode electrolyte has an SOC of not more than 90%. In this embodiment, it is preferable that the redox flow battery system further include control means for controlling an operating state such that the SOC is within the specific range. As will be described later, the SOC is determined from a charge time and a theoretical charge time, for example. Thus, control means 200 may include, for example, input means 201 for previously inputting parameters (such as a charge current, a quantity of electricity of the active material) which are used for calculating the theoretical charge time as shown in FIG. 1 (II), charge time operation means 202 for calculating the theoretical charge time from the input parameters, storage means 203 for storing various input values, timer means 204 for measuring the charge time for battery 100, SOC operation means 205 for operating the SOC from the measured charge time and the theoretical charge time obtained by operation, determination means 206 for determining whether or not the SOC is within the specific range, and instruction means 207 for indicating continuation or suspension of operation of battery 100, circulation conditions of the electrolytes and the like, in order to adjust the charge time for battery 100 based on the results of the determination means, for example. For such control means, a computer including a processor having the operation means and the like, and including direct input means 210 such as a keyboard may be suitably used. Display means 211 such as a monitor may also be included.

Particularly, in the redox flow battery in the second embodiment, the positive electrode electrolyte contains both of a manganese ion and a titanium ion, and the negative electrode electrolyte contains at least one type of metal ion selected from a titanium ion, a vanadium ion, a chromium ion, a zinc ion, and a tin ion (a titanium ion is shown as an example in FIG. 2). Redox flow battery 100 in the second embodiment uses the manganese ion as the positive electrode active material and the metal ion mentioned above as the negative electrode active material.

Particularly, in the redox flow battery in the third embodiment, both of the positive electrode electrolyte and the negative electrode electrolyte contain both of a manganese ion and a titanium ion, the manganese ion in the positive electrode electrolyte serves as the positive electrode active material, and the titanium ion in the negative electrode electrolyte serves as the negative electrode active material.

The electrolytes and operating conditions of the redox flow battery in the first embodiment will be described below with reference to experimental examples.

Experimental Example 1

As the redox flow battery system shown in FIG. 1 in the first embodiment, a V/Mn-based redox flow battery using a manganese ion as a positive electrode active material and a vanadium ion as a negative electrode active material was structured, charged and discharged, and relation between a state of charge (SOC) of this positive electrode electrolyte and a precipitation phenomenon was examined.

As the positive electrode electrolyte, an electrolyte having a manganese ion (divalent) concentration of 1M was prepared by dissolving manganese sulfate (divalent) in a sulfuric acid aqueous solution ($H_2SO_4$aq) having a sulfuric acid concentration of 4M. As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. A carbon felt was used for each electrode, and an anion exchange membrane was used for the membrane.

In this experiment, a small single-cell battery in which an electrode had an area of 9 cm$^2$ was made, 6 ml (6 cc) of the electrolyte was prepared for each electrode, and charge and discharge was performed with these electrolytes. Particularly, in this experiment, a battery voltage when switching takes place between charge and discharge, i.e., a switching voltage was set as a maximum charge voltage, and the SOC of the positive electrode electrolyte upon completion of charge was varied by changing the switching voltage as shown in Table 1. Charge and discharge was performed with a constant current having a current density of 70 mA/cm$^2$, and charge was switched to discharge when the switching voltage shown in Table 1 was reached. The SOC was calculated as indicated below, on the assumption that a quantity of conducted electricity (integrated value: A×h (time)) had entirely been used for charge (one-electron reaction: $Mn^{2+} \rightarrow Mn^{3+}+e^-$). The SOC was measured using an initial charge time. In Experimental Example 1 and all the subsequent experimental examples, charge efficiency was almost 100%, and an error was considered to be small even on the assumption that the quantity of conducted electricity had entirely been used for charge.

Quantity of charged electricity (A·second) = charge time (t) × charge current (I)

Quantity of electricity of active material =
  mole number × Faraday constant = volume × concentration × 96,485 (A·second/mol)

Theoretical charge time = quantity of electricity of active material/charge current (I)

State of charge = quantity of charged electricity/theoretical quantity of charged electricity
  = (charge time × current)/(theoretical charge time × current)
  = charge time × theoretical charge time A charge and discharge cycle was repeated three times under the above conditions, and then presence of a precipitation was examined. The results are shown in Table 1.

TABLE 1

| Switching Voltage (V) | State of Charge (%) | Presence of Precipitation |
|---|---|---|
| 1.70 | 14 | No |
| 1.80 | 47 | No |
| 1.82 | 70 | No |
| 1.84 | 90 | No |
| 1.85 | 104 | Yes |
| 1.9 | 139 | Yes |
| 2.0 | 148 | Yes |
| 2.1 | 159 | Yes |

As shown in Table 1, when the SOC was more than 90%, a precipitation was generated even after three charge and discharge cycles, and it was difficult to obtain functionality of a battery after these cycles due to the precipitation. The precipitation was examined and found to be $MnO_2$.

In contrast, when the SOC was not more than 90%, oxidation-reduction reaction of divalent manganese ions and trivalent manganese ions occurred reversibly, and functionality of a battery could be obtained to a sufficient degree. When the SOC was nearly 90%, although a small amount of precipitation was observed, the battery could be used without any difficulty, and when the SOC was not more than 70%, a precipitation was not substantially observed. Further, by using the electrodes made of carbon felt, generated oxygen gas was substantially negligible.

It is thus shown that even in such redox flow battery using the positive electrode electrolyte containing a manganese ion as the positive electrode active material, generation of a precipitation of $MnO_2$ can be effectively suppressed, and the battery can be charged and discharged well by being operated such that the positive electrode electrolyte has an SOC of not more than 90%. In particular, the vanadium-manganese-based redox flow battery shown in this experimental example can have a high electromotive force of about 1.8V.

When chromium sulfate (trivalent), zinc sulfate (divalent) or tin sulfate (tetravalent) are used instead of the vanadium sulfate (trivalent), generation of a precipitation can be suppressed by operating the battery such that the positive electrode electrolyte has an SOC of not more than 90% upon completion of charge.

Experimental Example 2

As the redox flow battery system shown in FIG. 1 in the first embodiment, a Ti/Mn-based redox flow battery in which a negative electrode electrolyte contained a titanium ion was structured, charged and discharged, and battery properties (current efficiency, voltage efficiency, energy efficiency) were examined.

In this experiment, the negative electrode active material was a metal ion different from that in Experimental Example 1. Specifically, as the negative electrode electrolyte, an electrolyte having a titanium ion (tetravalent) concentration of 1M was prepared by dissolving titanium sulfate (tetravalent) in a sulfuric acid aqueous solution ($H_2SO_4$aq) having a sulfuric acid concentration of 3.6M. The positive electrode electrolyte used was the same as that in Experimental Example 1 (sulfuric acid concentration: 4M, manganese sulfate (divalent) was used, manganese ion (divalent) concentration: 1M). A carbon felt was used for each electrode, and an anion exchange membrane or a cation exchange membrane was used for the membrane.

As in Experimental Example 1, a small single-cell battery in which an electrode had an area of 9 $cm^2$ was made, 6 ml (6 cc) of the electrolyte was prepared for each electrode, and charge and discharge was performed with these electrolytes and a constant current having a current density of 70 $mA/cm^2$, as in Experimental Example 1. In this experiment, charge was completed and switched to discharge when the switching voltage reached 1.60V as shown in FIG. 4, such that the positive electrode electrolyte had an SOC of not more than 90% upon completion of charge.

Figure 4:
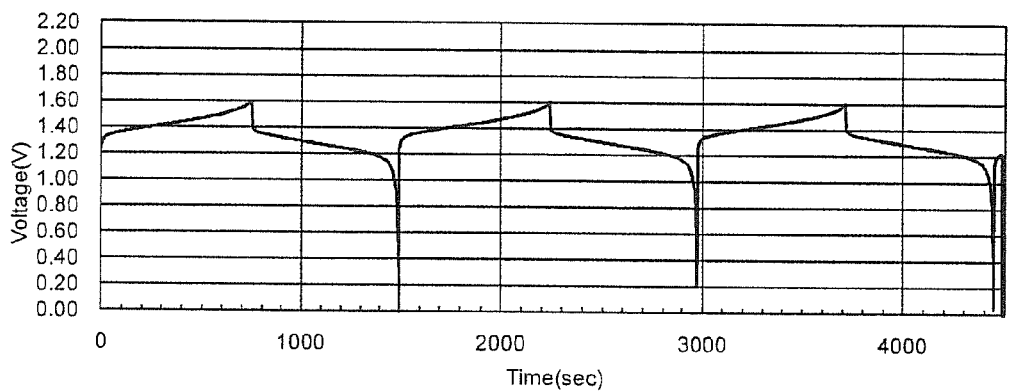
FIG. 4 shows graphs illustrating relation between a cycle time (sec) of charge and discharge and a battery voltage (V) with different membranes, in a Ti/Mn-based redox flow battery manufactured in Experimental Example 2.
Figure 4:
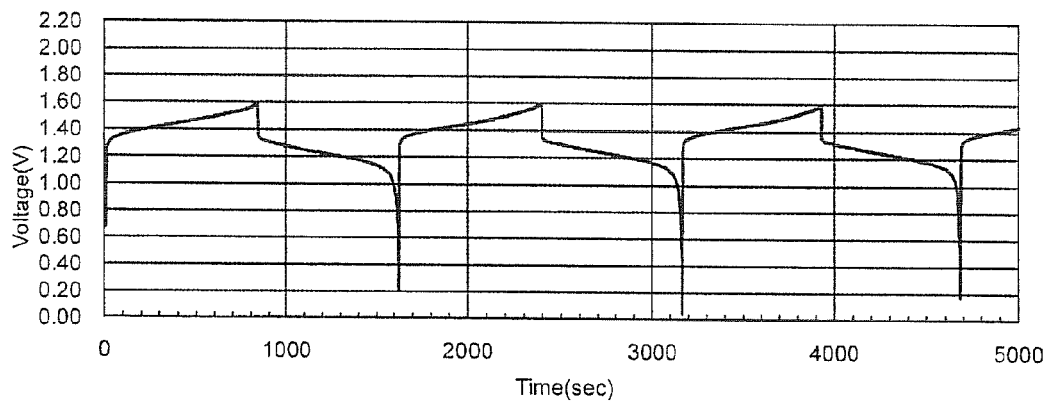

As a result, although a small amount of precipitation ($MnO_2$) was observed in both cases where the anion exchange membrane and the cation exchange membrane were used, it was confirmed that oxidation-reduction reaction of divalent manganese ions and trivalent manganese ions occurred reversibly, and functionality of a battery could be obtained without any difficulty as in Experimental Example 1, as shown in FIG. 4.

Further, for both cases where the anion exchange membrane was used and the cation exchange membrane was used, current efficiency, voltage efficiency, and energy efficiency of charge and discharge described above were examined. Current efficiency is expressed as a quantity of discharged electricity (C)/a quantity of charged electricity (C), voltage efficiency is expressed as a discharge voltage (V)/a charge voltage (V), and energy efficiency is expressed as current efficiency × voltage efficiency. Each efficiency was calculated by measuring an integrated value of a quantity of conducted electricity (A×h (time)), an average voltage during charge and an average voltage during discharge, and using these measured values. Further, the SOC was determined in the same manner as Experimental Example 1.

As a result, when the anion exchange membrane was used, the current efficiency was 97.8%, the voltage efficiency was 88.6%, the energy efficiency was 86.7%, the discharged capacity (expressed as discharge time since a current value is constant here) was 12.9 min (ratio to theoretical discharged capacity: 84%), and the SOC was 86% (13.2 min), and when the cation exchange membrane was used, the current efficiency was 98.2%, the voltage efficiency was 85.1%, the energy efficiency was 83.5%, the discharged capacity was 12.9 min (ratio to theoretical discharged capacity: 84%), and the SOC was 90% (14 min), and it was confirmed that excellent battery properties were obtained in both cases.

Experimental Example 3

Figure 5:
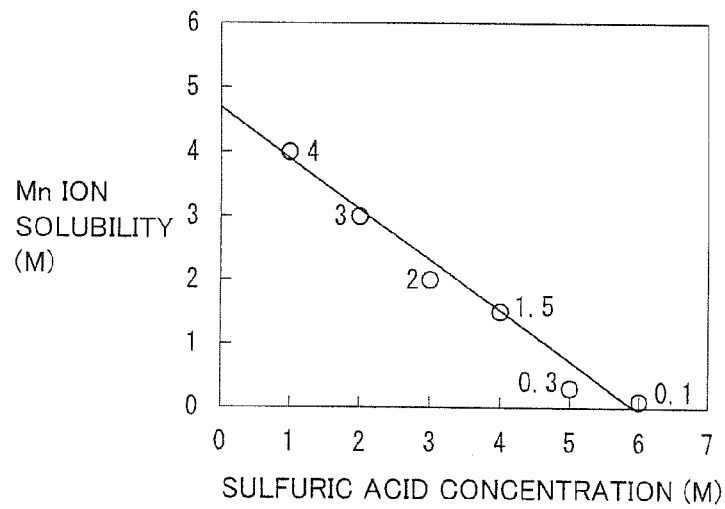
FIG. 5 is a graph showing relation between sulfuric acid concentration (M) and manganese ion (divalent) solubility (M).

Solubility of a manganese ion (divalent) in sulfuric acid ($H_2SO_4$) was examined. The results are shown in FIG. 5. As shown in FIG. 5, it can be seen that the solubility of a manganese ion (divalent) decreases as sulfuric acid concentration increases, and the solubility is 0.3M when the sulfuric acid concentration is 5M. Conversely, it can be seen that high solubility of 4M is obtained in an area of low sulfuric acid concentration. The results show that, in order to increase manganese ion concentration in an electrolyte, particularly in order to obtain a practically desired concentration of not less than 0.3M, when a sulfuric acid aqueous solution is used as a solvent for the electrolyte, it is preferable to have a low sulfuric acid concentration of less than 5M.

Experimental Example 4

A vanadium-manganese-based redox flow battery system was structured, charged and discharged in the same manner as Experimental Example 1, and a precipitation state was examined.

In this experiment, as the positive electrode electrolyte, the following three types of positive electrode electrolytes (I) to (III) having different sulfuric acid concentrations and manganese ion (divalent) concentrations were prepared by dissolving manganese sulfate (divalent) in a sulfuric acid aqueous solution ($H_2SO_4$aq). As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. The conditions other than the electrolytes were the same as those for the redox flow battery in Experimental Example 1 (membrane: anion exchange membrane, electrode: carbon felt, area of electrode: 9 $cm^2$, amount of each electrolyte: 6 ml).

Figure 6:
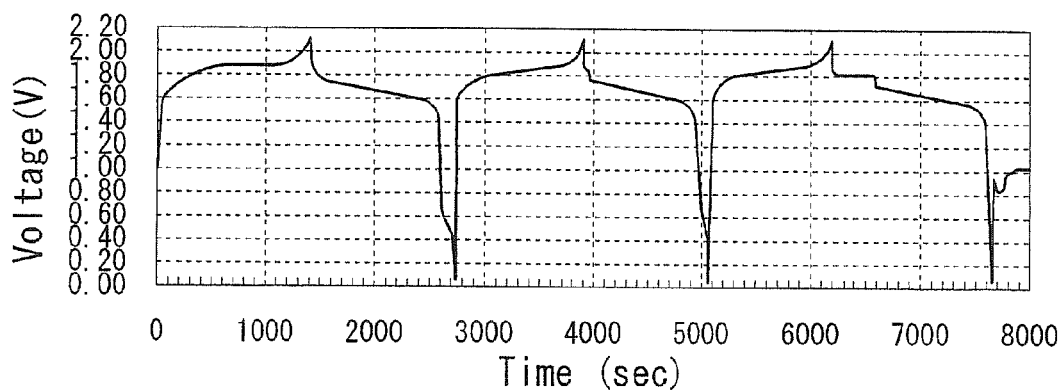
FIG. 6 shows graphs illustrating relation between a cycle time (sec) of charge and discharge and a battery voltage (V) with varying manganese ion concentrations, in a V/Mn-based redox flow battery manufactured in Experimental Example 4.
Figure 6:
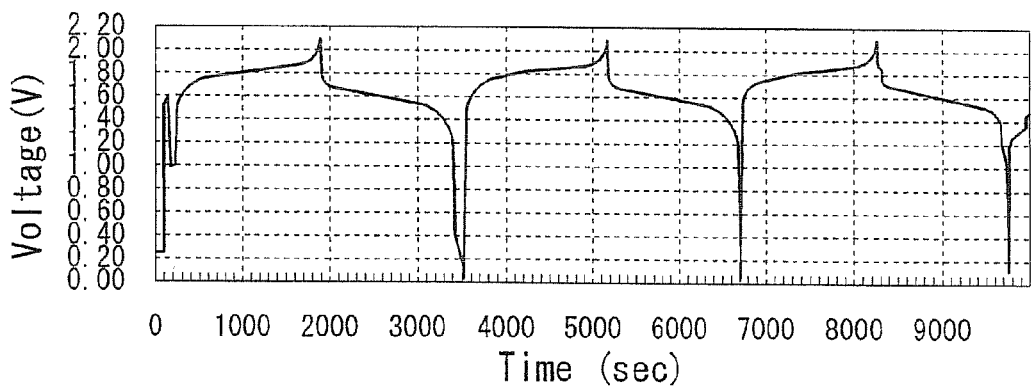
Figure 6:
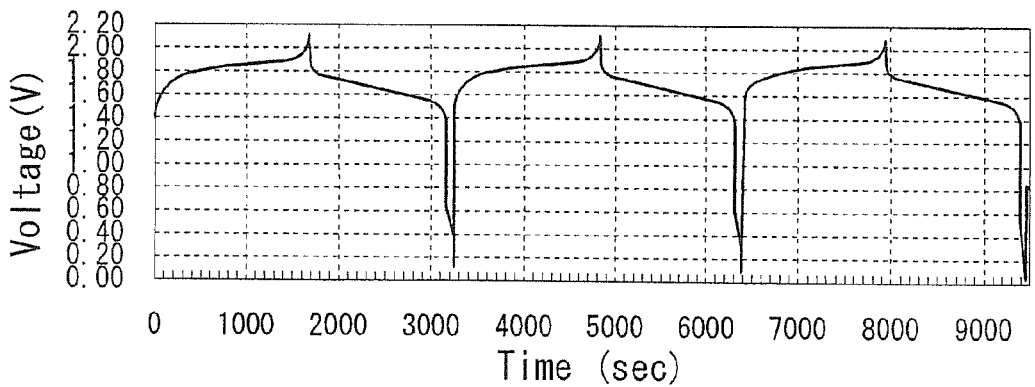

(I) Sulfuric acid concentration:manganese ion (divalent) concentration=1M:4M (II) Sulfuric acid concentration:manganese ion (divalent) concentration=2M:3M (III) Sulfuric acid concentration:manganese ion (divalent) concentration=4M:1.5M Charge and discharge was performed with a constant current having a current density of 70 mA/$cm^2$, and repeatedly performed such that charge was completed and switched to discharge when a battery voltage (switching voltage) reached 2.10V, as shown in FIG. 6.

As a result, when the positive electrode electrolytes (I) and (II) were used, the SOC was not more than 90%, and although a small amount of precipitation ($MnO_2$) was observed, charge and discharge could be performed well without any difficulty, as will be described later. In contrast, when the positive electrode electrolyte (III) was used, the SOC was more than 90% (122%), and a large amount of precipitated $MnO_2$ was observed after a few cycles. As such, it can be seen that different liquid compositions result in different SOCs even with the same switching voltage. Thus, when the battery is operated over a long period of time with the positive electrode electrolyte having an SOC of more than 90%, measures to suppress precipitation of $MnO_2$ need to be taken.

Battery properties of the redox flow battery used in this experiment were examined in the same manner as Experimental Example 2. The redox flow battery using the positive electrode electrolyte (I) had a current efficiency of 84.2%, a voltage efficiency of 81.4%, an energy efficiency of 68.6%, a discharged capacity (expressed as discharge time since a current value is constant here) of 18.2 min (ratio to theoretical discharged capacity: 30%), and an SOC of 44% (26.8 min), the redox flow battery using the positive electrode electrolyte (II) had a current efficiency of 94.2%, a voltage efficiency of 87.6%, an energy efficiency of 82.6%, a discharged capacity of 25.7 min (ratio to theoretical discharged capacity: 56%), and an SOC of 60% (27.4 min), and the redox flow battery using the positive electrode electrolyte (III) had, when measured in an early stage of operation, a current efficiency of 97.1%, a voltage efficiency of 89.4%, an energy efficiency of 86.7%, a discharged capacity of 25.6 min (ratio to theoretical discharged capacity: 111%), and an SOC of 122% (28.1 min). It can be seen that excellent battery properties are attained over a long period of time when the positive electrode electrolytes (I), (II) are used. In addition, it can be said from these results that the battery properties tend to be better with increase in sulfuric acid concentration, and with decrease in manganese ion (divalent) concentration when the concentration is not less than 0.3M and not more than 5M.

Experimental Example 5

A vanadium-manganese-based redox flow battery system was structured, charged and discharged in the same manner as Experimental Example 4, and a precipitation state was examined.

Figure 7:
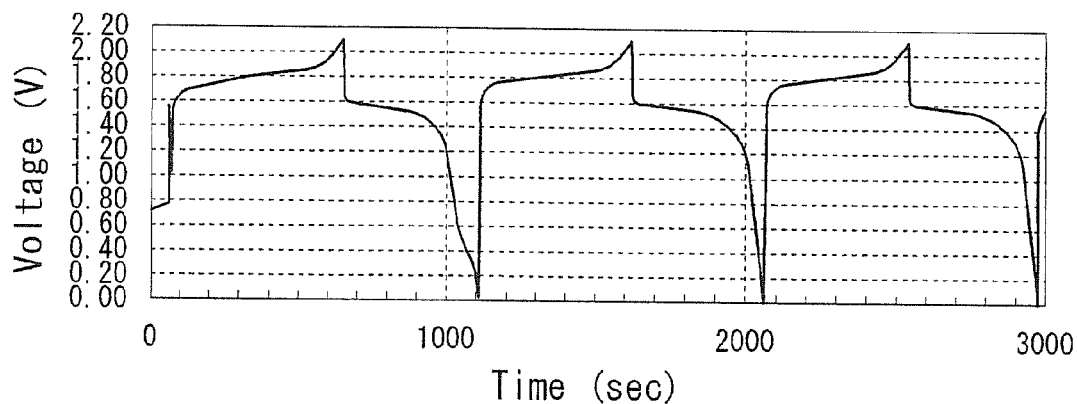
FIG. 7 shows graphs illustrating relation between a cycle time (sec) of charge and discharge and a battery voltage (V) with varying sulfuric acid concentrations, in a V/Mn-based redox flow battery manufactured in Experimental Example 5.
Figure 7:
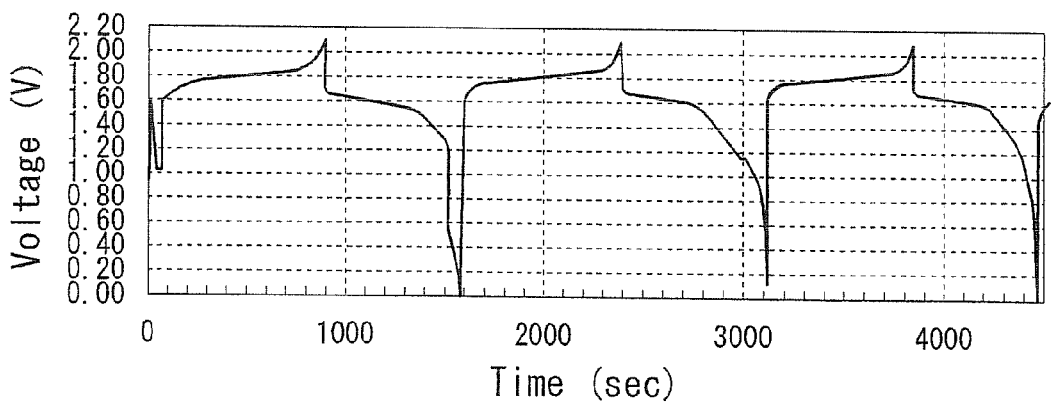
Figure 7:
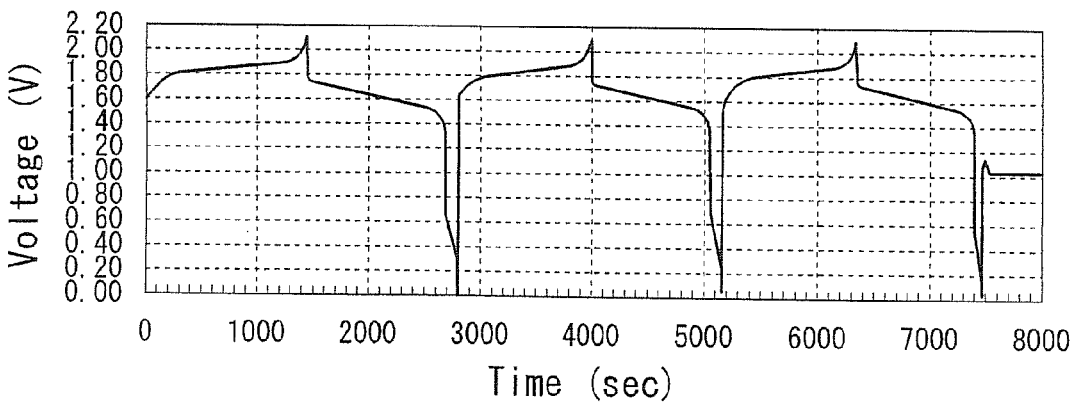

In this experiment, three types of positive electrode electrolytes having a manganese ion (divalent) concentration fixed to 1M and different sulfuric acid concentrations 2M, 3M, 4M (referred to as electrolytes (I), (II), (III), respectively) were prepared, and the other conditions were the same as those in Experimental Example 4 (sulfuric acid concentration in negative electrode electrolyte: 1.75M, vanadium ion (trivalent) concentration in negative electrode electrolyte: 1.7M, membrane: anion exchange membrane, electrode: carbon felt, area of electrode: 9 $cm^2$, amount of each electrolyte: 6 ml). Charge and discharge was repeatedly performed under the same conditions as those in Experimental Example 4 (switching voltage: 2.1V, current density: 70 mA/$cm^2$). FIG. 7 shows relation between a cycle time of charge and discharge and the battery voltage when the electrolytes (I) to (III) were used.

As a result, the redox flow battery using the electrolytes (I) and (II) that could be operated such that the SOC was not more than 90% could be charged and discharged well without any difficulty although a small amount of precipitation ($MnO_2$) was observed, as will be described later. In contrast, the redox flow battery using the electrolyte (III) having an SOC of more than 90% could be operated for about three cycles, but a large amount of precipitation was observed after a few cycles of operation, resulting in difficulty in continuing the operation.

Battery properties of the redox flow battery used in this experiment were examined in the same manner as Experimental Example 2. The redox flow battery using the electrolyte (I) had a current efficiency of 86.1%, a voltage efficiency of 84.4%, an energy efficiency of 72.6%, a discharged capacity (expressed as discharge time since a current value is constant here) of 7.3 min (ratio to theoretical discharged capacity: 48%), and an SOC of 63% (9.7 min), and the redox flow battery using the electrolyte (II) had a current efficiency of 89.1%, a voltage efficiency of 87.3%, an energy efficiency of 77.7%, a discharged capacity of 11.8 min (ratio to theoretical discharged capacity: 77%), and an SOC of 90% (13.7 min), which indicated excellent battery properties. In contrast, the redox flow battery using the electrolyte (III) had, when measured in an early stage of operation, a current efficiency of 96.9%, a voltage efficiency of 88.5%, an energy efficiency of 85.7%, a discharged capacity of 19.3 min (ratio to theoretical discharged capacity: 126%), and an SOC of 159% (24.3 min).

Here, a theoretical discharged capacity (which is discharge time here) of one-electron reaction in an electrolyte having a volume of 6 ml and a manganese ion (divalent) concentration of 1M is 15.3 minutes. In contrast, when the electrolyte (III) having a sulfuric acid concentration of 4M was used in this experiment, a discharged capacity of 19.3 minutes was surprisingly obtained. The reason for this increase in discharged capacity may be because $MnO_2$ (tetravalent) generated through disproportionation reaction was reduced to a manganese ion (divalent) through two-electron reaction. It is thus considered that the phenomenon resulting from two-electron reaction (tetravalent→divalent) can be utilized to increase energy density, thereby obtaining a higher battery capacity.

The redox flow battery in the second embodiment will be described below with reference to an experimental example.

Experimental Example 6

As the redox flow battery system shown in FIG. 2 in the second embodiment, a V/Mn-based redox flow battery system using a positive electrode electrolyte containing both a manganese ion and a titanium ion in, and a negative electrode electrolyte containing a vanadium ion was structured, charged and discharged, and a precipitation state and battery properties were examined.

In this experiment, as the positive electrode electrolyte, two types of sulfuric acid aqueous solutions ($H_2SO_4$aq) having different sulfuric acid concentrations were prepared, and manganese sulfate (divalent) and titanium sulfate (tetravalent) were dissolved in each of the sulfuric acid aqueous solutions, to prepare electrolytes having a manganese ion (divalent) concentration of 1M and a titanium ion (tetravalent) concentration of 1M (positive electrode Ti/positive electrode Mn=100%). The positive electrode electrolyte having a sulfuric acid concentration of 1M will be referred to as an electrolyte (I), and the positive electrode electrolyte having a sulfuric acid concentration of 2.5M will be referred to as an electrolyte (II). As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. A carbon felt was used for each electrode, and an anion exchange membrane was used for the membrane.

In this experiment, a small single-cell battery in which an electrode had an area of 9 $cm^2$ was made, 6 ml (6 cc) of the electrolyte was prepared for each electrode, and charge and discharge was performed with these electrolytes. Particularly, in this experiment, a battery voltage when switching takes place between charge and discharge, i.e., a switching voltage was set as a maximum charge voltage, and the switching voltage was set to 2.1V in both cases where the electrolytes (I) and (II) were used. Charge and discharge was performed with a constant current having a current density of 70 mA/$cm^2$, and charge was switched to discharge when the switching voltage was reached.

For the redox flow battery using the electrolytes (I), (II), the SOCs in an early stage of charge time were measured. The SOC was calculated in the same manner as Experimental Experiment 1, on the assumption that a quantity of conducted electricity (integrated value: A×h (time)) had entirely been used for charge (one-electron reaction: $Mn^{2+}→Mn^{3+}+e^-$). In this experiment, charge efficiency was almost 100%, and an error was considered to be small even on the assumption that the quantity of conducted electricity had entirely been used for charge.

Figure 8:
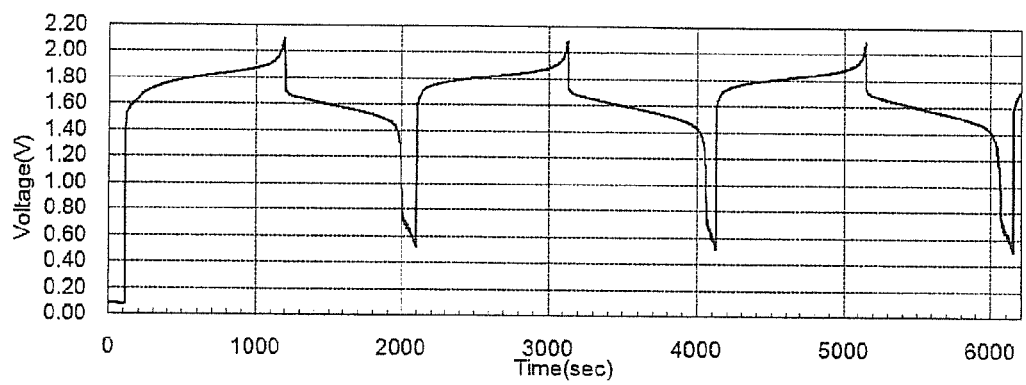
FIG. 8 shows graphs illustrating relation between a cycle time (sec) of charge and discharge and a battery voltage (V) with varying sulfuric acid concentrations, in a V/Mn-based redox flow battery manufactured in Experimental Example 6.
Figure 8:
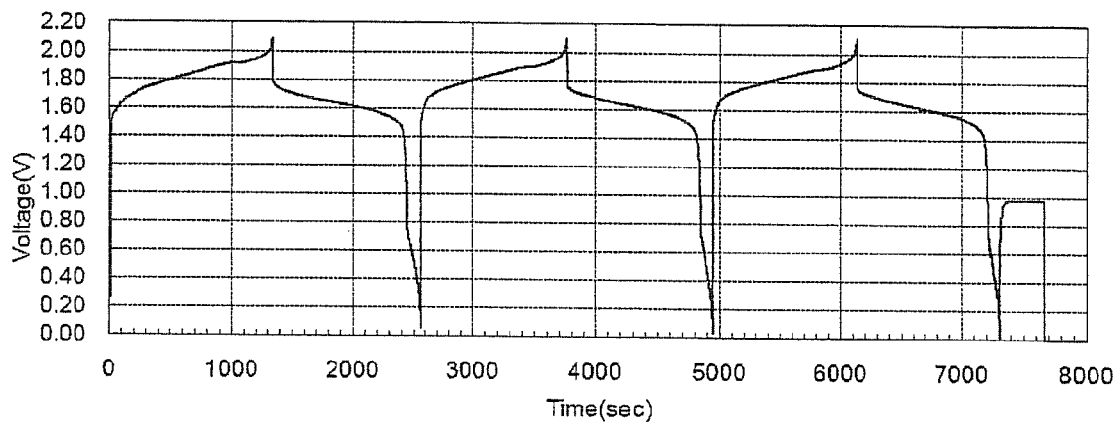

FIGS. 8 (I) and 8 (II) show relation between the cycle time of charge and discharge and the battery voltage when the electrolytes (I) and (II) were used, respectively. The redox flow battery using the electrolyte (I) had an SOC of 118% (18 min), and the redox flow battery using the electrolyte (II) had an SOC of 146%. It was confirmed that, even if charge was performed until after the positive electrode electrolyte had an SOC of more than 100%, and further more than 130% upon completion of charge, a precipitation ($MnO_2$) was not substantially observed at all, and oxidation-reduction reaction of divalent manganese ions and trivalent manganese ions occurred reversibly, allowing functionality of a battery without any difficulty. It is assumed from these results that by containing a titanium ion in the positive electrode electrolyte, $Mn^{3+}$ is stabilized, and any generated $MnO_2$ is not precipitated but exists stably in the electrolyte, acting on charge and discharge reaction.

Further, for both cases where the electrolytes (I) and (II) were used, current efficiency, voltage efficiency, and energy efficiency of charge and discharge described above were examined. The current efficiency, voltage efficiency, and energy efficiency were calculated in the same manner as Experimental Example 2.

As a result, when the electrolyte (I) was used, the current efficiency was 98.4%, the voltage efficiency was 85.6%, and the energy efficiency was 84.2%, and when the electrolyte (II) was used, the current efficiency was 98.3%, the voltage efficiency was 87.9%, and the energy efficiency was 86.4%, and it was confirmed that excellent battery properties were obtained in both cases.

Here, a theoretical discharged capacity (expressed as discharge time here) of one-electron reaction in an electrolyte having a volume of 6 ml and a manganese ion (divalent) concentration of 1M is 15.3 minutes, as described above. In contrast, when the electrolytes (I) and (II) were used, the discharged capacities were 16.8 min, 19.7 min, respectively, which correspond to 110%, 129% with respect to the theoretical discharged capacity, respectively. The reason for this increase in discharged capacity may be because $MnO_2$ (tetravalent) that had been generated during charge was reduced to a manganese ion (divalent) through two-electron reaction. The reason for this may also be because a ratio of ion concentration in the positive electrode electrolyte, namely, positive electrode Ti/positive electrode Mn was not less than 50%, as demonstrated in experimental examples to be described later. It is thus considered that the phenomenon resulting from two-electron reaction (tetravalent→divalent) can be utilized as described above to increase energy density, thereby obtaining a higher battery capacity.

It is thus shown that even in such redox flow battery using the positive electrode electrolyte containing a manganese ion as the positive electrode active material, generation of a precipitation of $MnO_2$ can be effectively suppressed, and the battery can be charged and discharged well by containing a titanium ion. In particular, the vanadium-manganese-based redox flow battery shown in this experimental example can have a high electromotive force of about 1.8V. Further, by using the electrodes made of carbon felt, generated oxygen gas was substantially negligible.

When chromium sulfate (trivalent), zinc sulfate (divalent), tin sulfate (tetravalent) are used instead of the vanadium sulfate (trivalent) above, generation of a precipitation can be suppressed by containing both a manganese ion and a titanium ion (tetravalent) in the positive electrode electrolyte.

Experimental Example 7

As the redox flow battery system shown in FIG. 2, a Ti/Mn-based redox flow battery system using a positive electrode electrolyte containing both a manganese ion and a titanium ion in, and a negative electrode electrolyte containing a titanium ion was structured, charged and discharged, and energy density, a manganese electromotive force at the positive electrode, and an SOC were examined.

In this experiment, as the positive electrode electrolyte, positive electrode electrolytes with varying concentrations of a manganese ion (divalent) and a titanium ion (tetravalent) were prepared by dissolving manganese sulfate (divalent): $MnSO_4$ and titanium sulfate (tetravalent): $TiOSO_4$ in a sulfuric acid aqueous solution having a sulfuric acid concentration of 2M. Amounts of manganese sulfate and titanium sulfate to be added were adjusted such that a ratio of concentration of the titanium ion to the manganese ion (=molar ratio), namely, positive electrode Ti/positive electrode Mn had values indicated in Table 2. Sample No. 7-1 is an electrolyte in which only manganese sulfate was dissolved without the addition of titanium sulfate.

TABLE 2

| Sample No. | Titanium Ion Concentration (M) | Manganese Ion Concentration (M) | Positive Electrode Ti/Positive Electrode Mn | Negative Electrode Ti/Positive Electrode Ti |
|---|---|---|---|---|
| 7-1 | 0 | 1.2 | 0.0 | 0.0 |
| 7-2 | 0.3 | 1.2 | 0.25 (25%) | 333% |
| 7-3 | 0.5 | 1 | 0.5 (50%) | 200% |
| 7-4 | 0.7 | 1 | 0.7 (70%) | 143% |
| 7-5 | 0.8 | 1 | 0.8 (80%) | 125% |
| 7-6 | 1.2 | 1.2 | 1.0 (100%) | 83% |
| 7-7 | 1 | 0.75 | 1.3 (130%) | 100% |
| 7-8 | 1.2 | 0.83 | 1.4 (140%) | 83% |
| 7-9 | 1 | 0.5 | 2.0 (200%) | 100% |

As the negative electrode electrolyte, an electrolyte having a titanium ion (tetravalent) concentration of 1M was prepared by dissolving titanium sulfate (tetravalent) in a sulfuric acid aqueous solution having a sulfuric acid concentration of 2M. A carbon felt was used for each electrode, and an anion exchange membrane was used for the membrane.

In this experiment, a small single-cell battery in which an electrode had an area of 9 $cm^2$ was made, and 9 ml (9 cc) of the positive electrode electrolyte and a much larger amount of 25 ml (25 cc) of the negative electrode electrolyte were prepared. Then, with these prepared electrolytes, charge was performed with a constant current having a current density of 50 $mA/cm^2$ up to a charge-end voltage of 2.0V. After the charge, an SOC, energy density, and a manganese electromotive force at the positive electrode were examined.

The SOC was determined in the same manner as Experimental Experiment 1. The energy density ($kWh/m^3$) was determined as described below. When a concentration of the manganese ion at the positive electrode and a concentration of the titanium ion at the negative electrode were both set to 1 mol/liter, and a discharge average voltage was set to 1.3V, a value of energy density (only one-electron reaction; SOC: 100%) was calculated to be 17.4 $kWh/m^3$ from [{discharge (average) voltage (V)×ion concentration (mol/liter)×Faraday constant (A·sec/mol)}÷3600 (sec/h)÷2 (positive and negative)]. With this value as a reference density, the energy density of each sample was determined from the reference density×the SOC of each sample. The manganese electromotive force at the positive electrode was determined as a potential relative to a standard hydrogen electrode: SHE. In this experiment, the electromotive force was measured by utilizing a separately manufactured monitor cell. Specifically, a monitor cell (single cell) having the same structure as the above single-cell battery was manufactured and electrically connected in series to the single-cell battery, and a voltage across a positive electrode of the monitor cell without voltage application and a reference electrode (Ag/AgCl electrode) separately inserted in the positive electrode electrolyte was measured as the manganese electromotive force at the positive electrode. The results are shown in FIG. 9 and Table 3.

TABLE 3

| Sample No. | 7-1 | 7-2 | 7-3 | 7-4 | 7-5 | 7-6 | 7-7 | 7-8 | 7-9 |
|---|---|---|---|---|---|---|---|---|---|
| Positive Electrode Ti/Positive Electrode Mn | 0.0 | 0.25 | 0.5 | 0.7 | 0.8 | 1.0 | 1.3 | 1.4 | 2.0 |
| State of Charge: SOC (%) | 100 | 94 | 133 | 137 | 160 | 160 | 145 | 160 | 144 |
| Positive Electrode Manganese Electromotive Force (V) | 1.46 | 1.458 | 1.457 | 1.462 | 1.457 | 1.49 | 1.48 | 1.49 | 1.49 |
| Volume Energy Density ($kWh/m^3$) | 17.4 | 16.4 | 23.2 | 23.9 | 27.9 | 27.9 | 25.3 | 27.9 | 25.1 |

Figure 9:
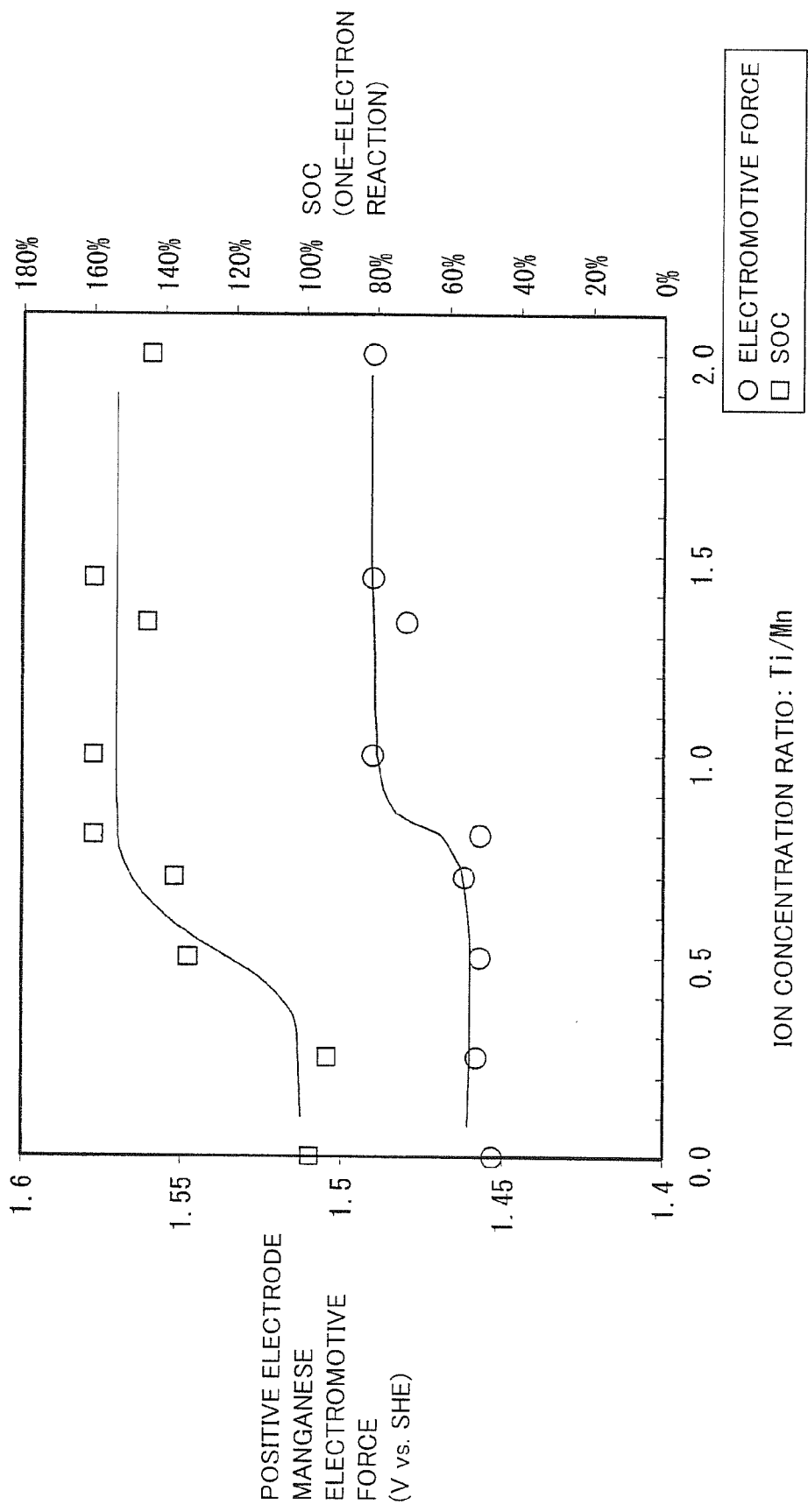
FIG. 9 shows a graph illustrating relation among a ratio of concentration of a titanium ion to a manganese ion in a positive electrode electrolyte, namely, positive electrode Ti/positive electrode Mn, a manganese electromotive force at a positive electrode, and an SOC, in a Ti/Mn-based redox flow battery manufactured in Experimental Example 7.

As shown in FIG. 9 and Table 3, it can be seen that the energy density and electromotive force can be increased with an increase in ratio of concentration between the manganese ion and the titanium ion in the positive electrode electrolyte, namely, positive electrode Ti/positive electrode Mn. In particular, it can be seen that the energy density and electromotive force can be further increased by setting the positive electrode Ti/positive electrode Mn to not less than 0.5 (50%), further to not less than 0.8 (80%), particularly to not less than 1.0 (100%). It can therefore be understood that, in a redox flow battery using a positive electrode electrolyte containing a manganese ion as a positive electrode active material and further containing a titanium ion, the energy density and electromotive force can be increased by setting the concentrations of the manganese ion and titanium ion in the positive electrode electrolyte within a specific range. The increased energy density leads to size reduction of the tanks storing the electrolytes and occupying a large volume in the redox flow battery system, thereby contributing to size reduction of the system. In consideration of the energy density and electromotive force, it can be said that the positive electrode Ti/positive electrode Mn is most preferably not less than 1.0 (100%). When the SOC is higher than 130%, the energy density is higher than an ideal energy density of 18.8 kWh/m$^3$ when the discharge average voltage is set to 1.4V. The reason for this may be because two-electron reaction occurs in addition to one-electron reaction.

Experimental Example 8-1

A Ti/Mn-based redox flow battery system was structured in the same manner as Experimental Experiment 7, charged and discharged for several days, and battery properties (discharged capacity, current efficiency, voltage efficiency, energy efficiency) were examined.

In this experiment, as the positive electrode electrolyte, an electrolyte having a manganese ion (divalent) concentration of 1M and a titanium ion (tetravalent) concentration of 0.8M (positive electrode Ti/positive electrode Mn=0.8 (80%)) was prepared by dissolving manganese sulfate (divalent): MnSO$_4$ and titanium sulfate (tetravalent): TiOSO$_4$ in a sulfuric acid aqueous solution having a sulfuric acid concentration of 2M. As the negative electrode electrolyte, an electrolyte having a titanium ion (tetravalent) concentration of 0.4M (negative electrode Ti/positive electrode Ti=0.5 (50%)) was prepared by dissolving titanium sulfate (tetravalent): TiOSO$_4$ in a sulfuric acid aqueous solution having a sulfuric acid concentration of 2M.

In this experiment, the Ti/Mn-based redox flow battery system including a battery cell capable of output of about 50 W was structured by using about 2 L (liter) of the positive electrode electrolyte, about 6 L of the negative electrode electrolyte, an anion exchange membrane for the membrane, a carbon felt for each electrode, and an area of 500 cm$^2$ for each electrode.

Figure 10:
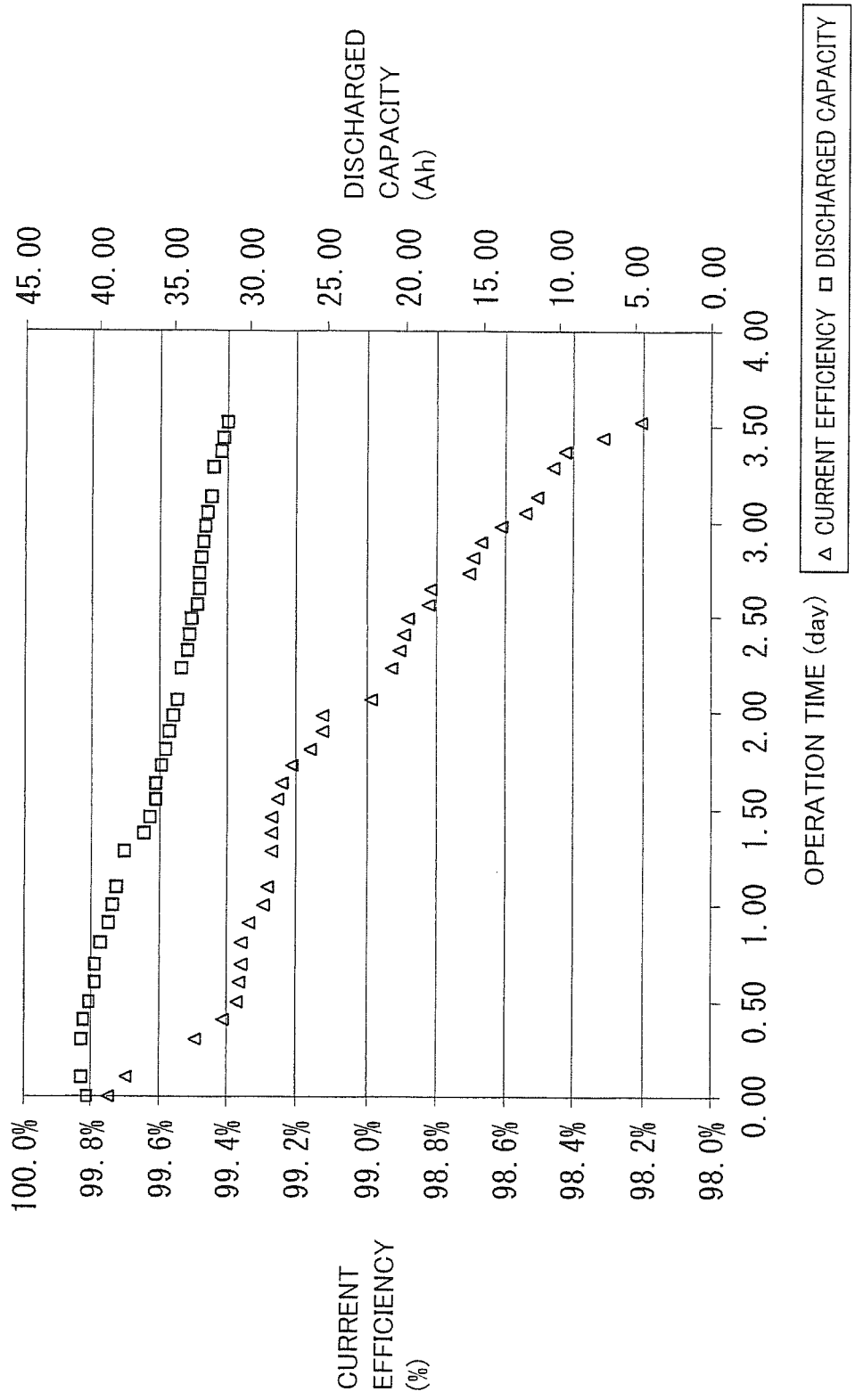
FIG. 10 shows a graph illustrating variation in current efficiency and variation in discharged capacity over time when charge and discharge was performed with positive and negative electrode electrolytes in which a titanium ion concentration in the negative electrode electrolyte was lower than a titanium ion concentration in the positive electrode electrolyte, in a Ti/Mn-based redox flow battery manufactured in Experimental Example 8-1.

The above redox flow battery was charged and discharged for about four days with a constant current having a current density of 70 mA/cm$^2$ (switching voltage: 1.5V). FIG. 10 shows current efficiency and a discharged capacity during operation. The current efficiency, voltage efficiency and energy efficiency were determined in the same manner as Experimental Example 2. The discharged capacity (Ah) was determined from discharge time (h)×current (A) (current=current density×electrode area). As a result, the voltage efficiency was almost constant at 85% since there was no significant variation in resistance, whereas the current efficiency decreased from 99.7% to 98.2%. In this experiment, it can be seen that the current efficiency decreased sharply in about a half day as shown in FIG. 10. Due to the decreased current efficiency, the energy efficiency also decreased from 84.7% to 83%. The discharged capacity also decreased from 41 Ah to 31 Ah. Upon examination of the cause for this, the titanium ion concentration was less than 50% of the manganese ion concentration in the positive electrode electrolyte after the charge and discharge for about four days. It can thus be considered that the titanium ion in the positive electrode electrolyte diffused to the negative electrode electrolyte over time.

Experimental Example 8-2

Figure 11:
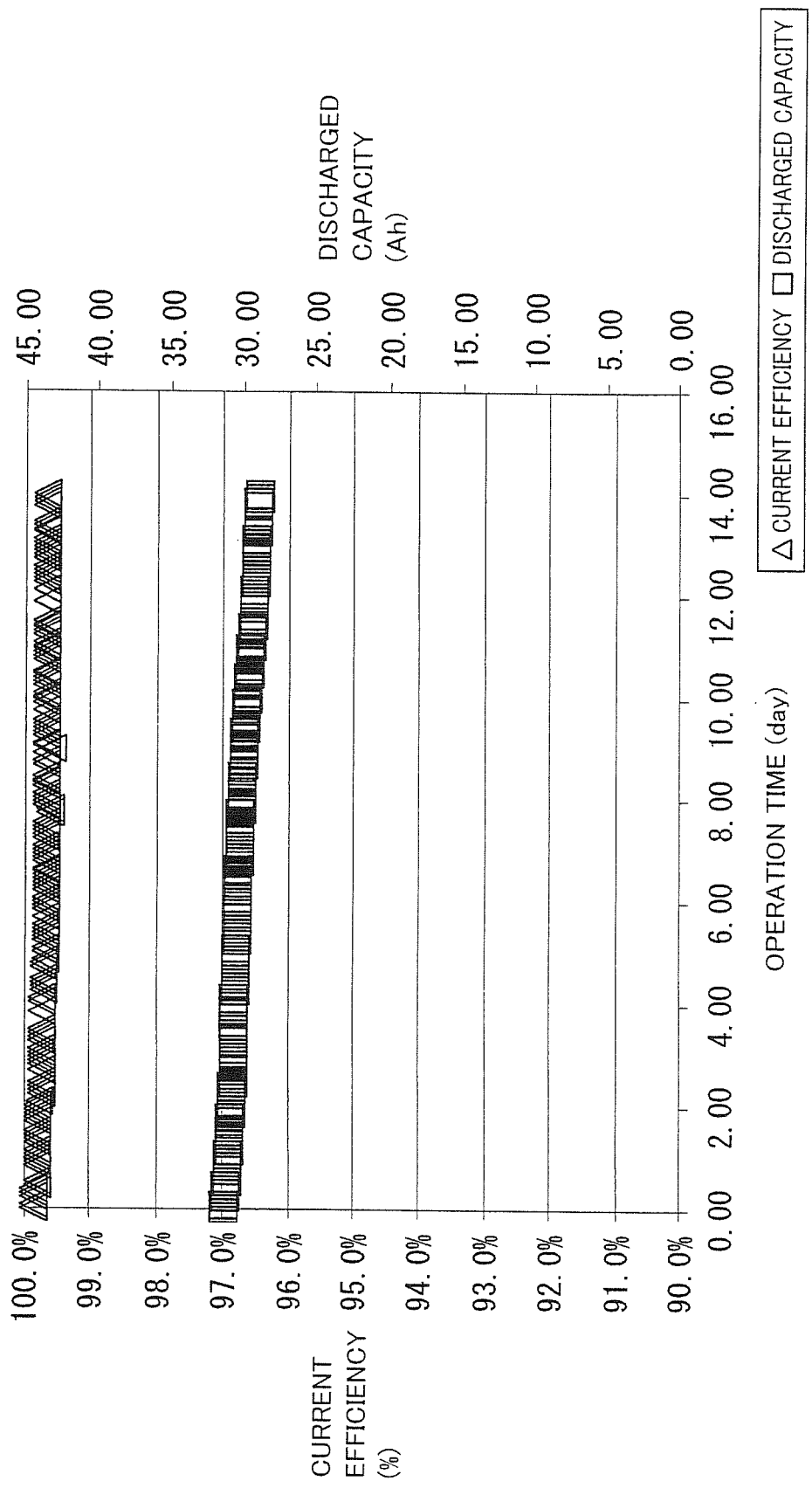
FIG. 11 shows a graph illustrating variation in current efficiency and variation in discharged capacity over time when charge and discharge was performed with positive and negative electrode electrolytes having the same titanium ion concentration, in a Ti/Mn-based redox flow battery manufactured in Experimental Example 8-2.

Accordingly, a negative electrode electrolyte having a different ratio of concentration of the titanium ion from that in Experimental Example 8-1, specifically, an electrolyte having a sulfuric acid concentration of 2M and a titanium ion (tetravalent) concentration of 0.8M (negative electrode Ti/positive electrode Ti=1 (100%)) was prepared. A positive electrode electrolyte similar to that in Experimental Example 8-1 (sulfuric acid concentration: 2M, manganese ion (divalent) concentration: 1M, titanium ion (tetravalent) concentration: 0.8M) was prepared. About 3 L (liter) of each electrode electrolyte was prepared. Then, a redox flow battery system capable of output of about 50 W as in Experimental Example 8-1 (anion exchange membrane, carbon felt electrode, electrode area: 500 cm$^2$) was structured, and charged and discharged for about four days with a constant current having a current density of 70 mA/cm$^2$ (switching voltage: 1.5V). FIG. 11 shows current efficiency and a discharged capacity during operation.

As shown in FIG. 11, when the titanium ion concentrations in both electrolytes were equal to each other, the current efficiency was 99.7% and the discharged capacity was 30 Ah, which were constant with little decrease. The reason for this result may be because the diffusion of the titanium ion at the positive electrode toward the negative electrode could be suppressed by setting the titanium ion concentration in the negative electrode electrolyte to be equal to or higher than the titanium ion concentration in the positive electrode electrolyte. Further, as shown in FIG. 11, there was little decrease in current efficiency and discharged capacity in this redox flow battery after continued charge and discharge for about two weeks. It can therefore be said that a Ti/Mn-based redox flow battery can maintain excellent battery properties, namely, can have stable performance over a long period of time, by equalizing titanium ion concentrations in both electrolytes with each other, or by increasing a titanium ion concentration in a negative electrode electrolyte.

Experimental Example 9

A Ti/Mn-based redox flow battery system was structured in the same manner as Experimental Experiment 7, and relation between a cycle time of charge and discharge and a battery voltage was examined in the same manner as Experimental Experiment 6.

In this experiment, an ion exchange membrane having a sufficiently lower permeability of a manganese ion and a titanium ion than that of the anion exchange membrane used in Experimental Examples 8 was used for the membrane. Specifically, a commercialized product (Nafion® PFSA membrane: N-117) made of a copolymer of perfluorosulfonic acid and polytetrafluoroethylene (PTFE) was used.

Figure 12:
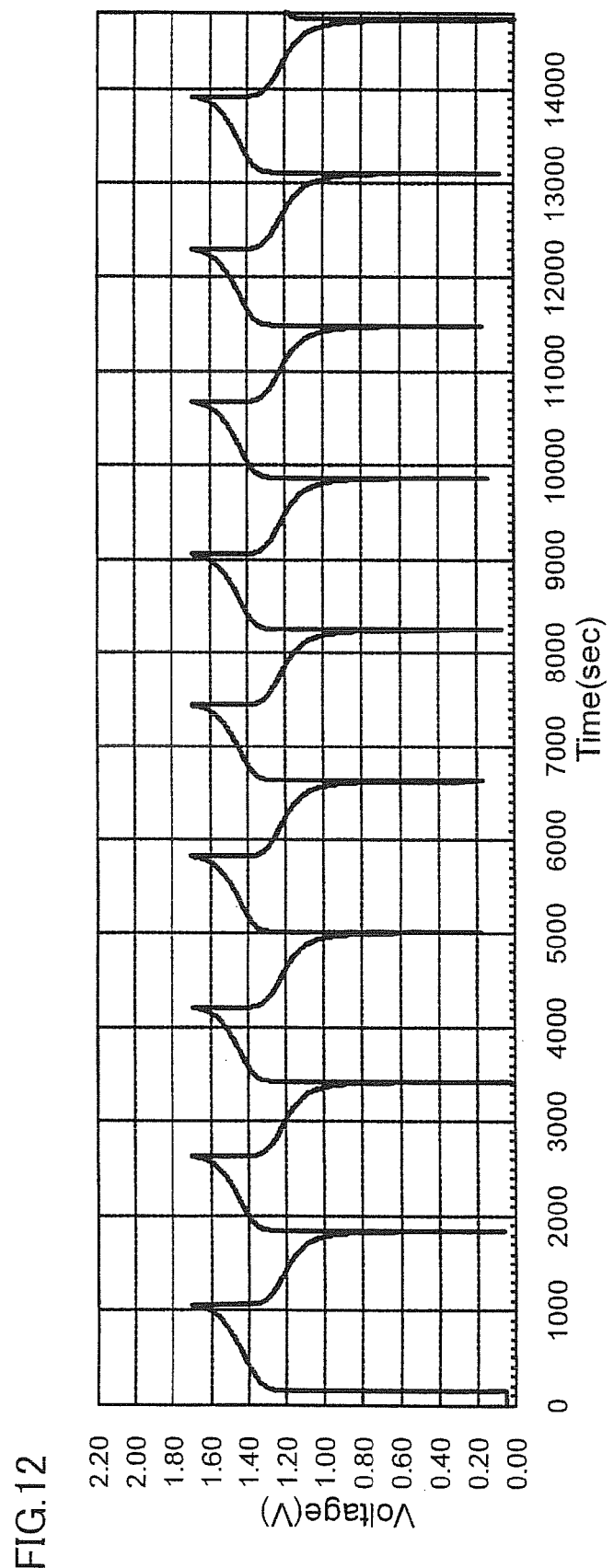
FIG. 12 shows a graph illustrating relation between a cycle time (sec) of charge and discharge and a battery voltage (V) when charge and discharge was performed with an ion exchange membrane for a membrane, in a Ti/Mn-based redox flow battery manufactured in Experimental Example 9.

In this experiment, an amount of 7 ml (7 cc) of a positive electrode electrolyte having a sulfuric acid concentration of 2M, a manganese ion (divalent) concentration of 1M, and a titanium ion (tetravalent) concentration of 0.8M (positive electrode Ti/positive electrode Mn=0.8 (80%)) was used, and an amount of 21 ml (21 cc) of a negative electrode electrolyte having a sulfuric acid concentration of 2M and a titanium ion (tetravalent) concentration of 0.4M (negative electrode Ti/positive electrode Ti=0.5 (50%)) was used. A small single-cell battery in which a carbon felt was used for each electrode and each electrode had an area of 9 cm$^2$ was made, and charged and discharged with a constant current having a current density of 70 mA/cm$^2$ (switching voltage: 1.7V). FIG. 12 shows relation between a cycle time of charge and discharge and a battery voltage. Further, in the same manner as Experimental Experiment 1, an SOC calculated from an initial charge time and an SOC after 9 cycles were examined. Furthermore, in the same manner as Experimental Experiment 2, battery properties (current efficiency, voltage efficiency, energy efficiency) were examined.

As a result, excellent battery properties were confirmed with a current efficiency of 100%, a voltage efficiency of 82.1%, and an energy efficiency of 82.1%. In this experiment, the current efficiency was kept constant at almost 100% during the 9 cycles of charge and discharge. Further, when a discharged capacity (which is discharge time here) was determined from the amounts of electrolytes and ion concentrations, an initial discharged capacity was 13.5 min, which remained unchanged at 13.5 min after 9 cycles, without substantial decrease in battery capacity. The reason for this result may be because the diffusion of the titanium ion in the positive electrode electrolyte toward the negative electrode could be prevented by using the ion exchange membrane having a low permeability of a titanium ion and a manganese ion. It can therefore be said that a Ti/Mn-based redox flow battery can maintain excellent battery properties over a long period of time by using an ion exchange membrane capable of sufficiently suppressing the permeation of a titanium ion and a manganese ion.

While the positive electrode electrolyte had the ratio of concentration of the titanium ion to the manganese ion, namely, the positive electrode Ti/positive electrode Mn of not less than 50% in Experimental Example 9, the ratio may be lower than 50%. While the negative electrode electrolyte had the titanium ion concentration equal to or lower than the titanium ion concentration in the positive electrode electrolyte in Experimental Example 9, the ratio may be equal to or higher. In this case, the diffusion of the titanium ion in the positive electrode electrolyte toward the negative electrode can be suppressed more effectively by using the specific ion exchange membrane described above in addition to adjusting the titanium ion concentration in the negative electrode electrolyte.

A redox flow battery in a third embodiment will be described below with reference to an experimental example.

Experimental Example 10

The redox flow battery system shown in FIG. 3 in the third embodiment was structured, charged and discharged with an electrolyte containing both a manganese ion and a titanium ion as both of the positive electrode electrolyte and the negative electrode electrolyte, and a precipitation state and battery properties were examined.

In this experiment, for both of the positive electrode electrolyte and the negative electrode electrolyte to contain the same types of metal ions, the same composition was used for the positive electrode electrolyte and the negative electrode electrolyte. Specifically, an electrolyte having a manganese ion (divalent) concentration of 1.2M and a titanium ion (tetravalent) concentration of 1.2M (positive electrode Ti/positive electrode Mn=1.0 (100%)) was prepared by dissolving manganese sulfate (divalent) and titanium sulfate (tetravalent) in a sulfuric acid aqueous solution ($H_2SO_4$aq) having a sulfuric acid concentration of 2M. A carbon felt was used for each electrode, and an anion exchange membrane was used for the membrane.

In this experiment, a small single-cell battery in which an electrode had an area of 9 cm$^2$ was made, 6 ml (6 cc) of the electrolyte was prepared for each electrode in Embodiment (I), 6 ml (6 cc) of the positive electrode electrolyte and 9 ml (9 cc) of the negative electrode electrolyte were prepared in Embodiments (II) and (III), and charge and discharge was performed with these electrolytes. Particularly, in this experiment, a battery voltage when switching takes place between charge and discharge, i.e., a switching voltage was set as a maximum charge voltage, and the switching voltage was set to 1.7V in Embodiments (I) to (III). Charge and discharge was performed with a constant current having a current density of 50 mA/cm$^2$ in Embodiments (I) and (III) and with a constant current having a current density of 70 mA/cm$^2$ in Embodiment (II), and charge was switched to discharge when the switching voltage was reached.

For the redox flow battery in Embodiments (I), (II) and (III), the SOCs in an early stage of charge time were measured. The SOC was calculated in the same manner as Experimental Experiment 1, on the assumption that a quantity of conducted electricity (integrated value: A×h (time)) had entirely been used for charge (one-electron reaction: $Mn^{2+} \rightarrow Mn^{3+}+e^-$). In this experiment, charge efficiency was almost 100%, and an error was considered to be small even on the assumption that the quantity of conducted electricity had entirely been used for charge.

Figure 13:
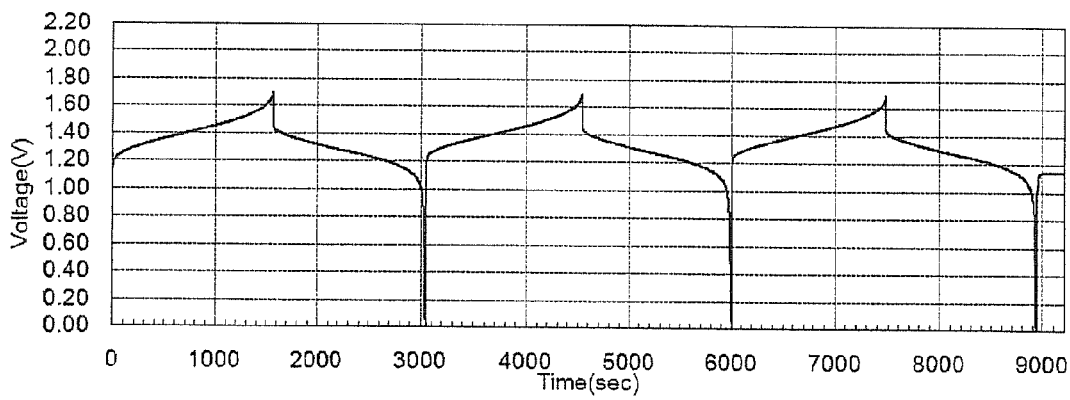
FIG. 13 shows graphs illustrating relation between a cycle time (sec) of charge and discharge and a battery voltage (V) with varying amounts of positive and negative electrode electrolytes and/or current density, in a Ti/Mn-based redox flow battery manufactured in Experimental Example 10.
Figure 13:
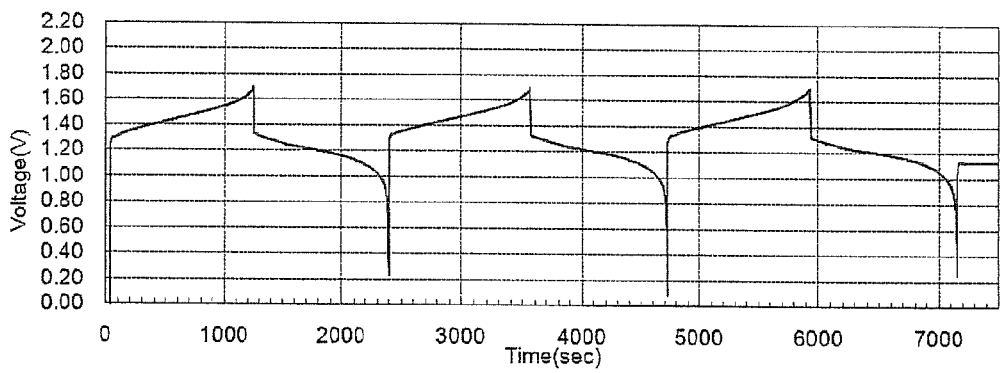
Figure 13:
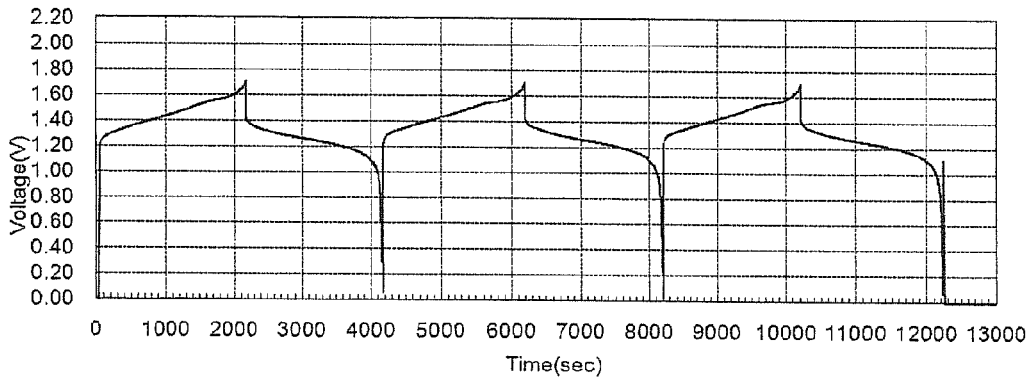

FIGS. 13 (I), 13 (II) and 13 (III) show relation between the cycle time of charge and discharge and the battery voltage in Embodiments (I), (II) and (III), respectively. The SOC in Embodiment (I) was 101% (26 min), and by making the amount of negative electrode electrolyte higher than the amount of positive electrode electrolyte to increase the SOC, the SOC in Embodiment (II) was 110% (20.2 min). Further, by decreasing the current density from 70 mA/cm$^2$ to 50 mA/cm$^2$ to increase the SOC with the same amounts of electrolytes of both electrodes as in Embodiment (II), the SOC in Embodiment (III) was 139% (35.6 min). It was confirmed that, even if charge was performed until after the positive electrode electrolyte had an SOC of more than 100%, and further more than 130% upon completion of charge in this manner, a precipitation ($MnO_2$) was not substantially observed at all, and oxidation-reduction reaction of divalent manganese ions and trivalent manganese ions occurred reversibly, allowing functionality of a battery without any difficulty. It is assumed from these results that by containing a titanium ion in the positive electrode electrolyte, $Mn^{3+}$ is stabilized, and any generated $MnO_2$ is not precipitated but exists stably in the electrolyte, acting on charge and discharge reaction.

Further, for Embodiments (I), (II) and (III), current efficiency, voltage efficiency, and energy efficiency of charge and discharge described above were examined. The current efficiency, voltage efficiency, and energy efficiency were calculated in the same manner as Experimental Example 2.

As a result, the current efficiency was 98.8%, the voltage efficiency was 88.9%, and the energy efficiency was 87.9% in Embodiment (I), the current efficiency was 99.8%, the voltage efficiency was 81.6%, and the energy efficiency was 81.4% in Embodiment (II), and the current efficiency was 99.6%, the voltage efficiency was 85.3%, and the energy efficiency was 85.0% in Embodiment (III), and it was confirmed that excellent battery properties were obtained in all cases.

Here, a theoretical discharged capacity (expressed as discharge time since a current value is constant here) of one-electron reaction ($Mn^{3+}+e^-\rightarrow Mn^{2+}$) in an electrolyte having a volume of 6 ml and a manganese ion (divalent) concentration of 1.2M is 25.7 minutes (50 mA/cm$^2$). In contrast, the discharged capacities in Embodiments (I) to (III) were 24.2 min (50 mA/cm$^2$), 20.1 min (70 mA/cm$^2$), and 33.5 min (50 mA/cm$^2$), respectively. The reason for this increase in discharged capacity may be because $MnO_2$ (tetravalent) generated during charge was reduced to a manganese ion (divalent) through two-electron reaction. The reason for this may also be because a ratio of ion concentration in the positive electrode electrolyte, namely, positive electrode Ti/positive electrode Mn was not less than 50%. It is thus considered that the phenomenon resulting from two-electron reaction (tetravalent→divalent) can be utilized as described above to increase energy density, thereby obtaining a higher battery capacity.

It is thus shown that even in such redox flow battery using the positive electrode electrolyte containing a manganese ion as the positive electrode active material, generation of a precipitation of $MnO_2$ can be effectively suppressed, and the battery can be charged and discharged well by containing a titanium ion. In particular, the titanium-manganese-based redox flow battery shown in this experimental example can have a high electromotive force of about 1.4V. Moreover, since the types of metal ions existing in the electrolytes of the positive and negative electrodes are equal to each other in this redox flow battery, excellent effects can be attained. Namely, (1) battery capacity decrease due to movement of the metal ions to a counter electrode does not substantially occur, (2) even if liquid transfer occurs to cause variation in amount of electrolyte and ion concentration between both electrodes, the variation can be readily corrected, and (3) the electrolytes can be readily produced. Further, by using the electrodes made of carbon felt, generated oxygen gas was substantially negligible.

Experimental Example 11

The redox flow battery system shown in FIG. 3 was structured, charged and discharged over a long period of time, and battery properties (discharged capacity, current efficiency, voltage efficiency, energy efficiency) were examined.

In this experiment, the same composition was used for the positive electrode electrolyte and the negative electrode electrolyte. Specifically, an electrolyte having a manganese ion (divalent) concentration of 1M and a titanium ion (tetravalent) concentration of 0.8M (positive electrode Ti/positive electrode Mn=0.8 (80%)) was prepared by dissolving manganese sulfate (divalent): $MnSO_4$ and titanium sulfate (tetravalent): $TiOSO_4$ in a sulfuric acid aqueous solution having a sulfuric acid concentration of 2M.

In this experiment, a Ti/Mn-based redox flow battery system including a battery cell capable of output of about 50 W was structured by using about 3 L (liter) of the electrolytes of both electrodes, an anion exchange membrane for the membrane, a carbon felt for each electrode, and an area of 500 cm$^2$ for each electrode.

Figure 14:
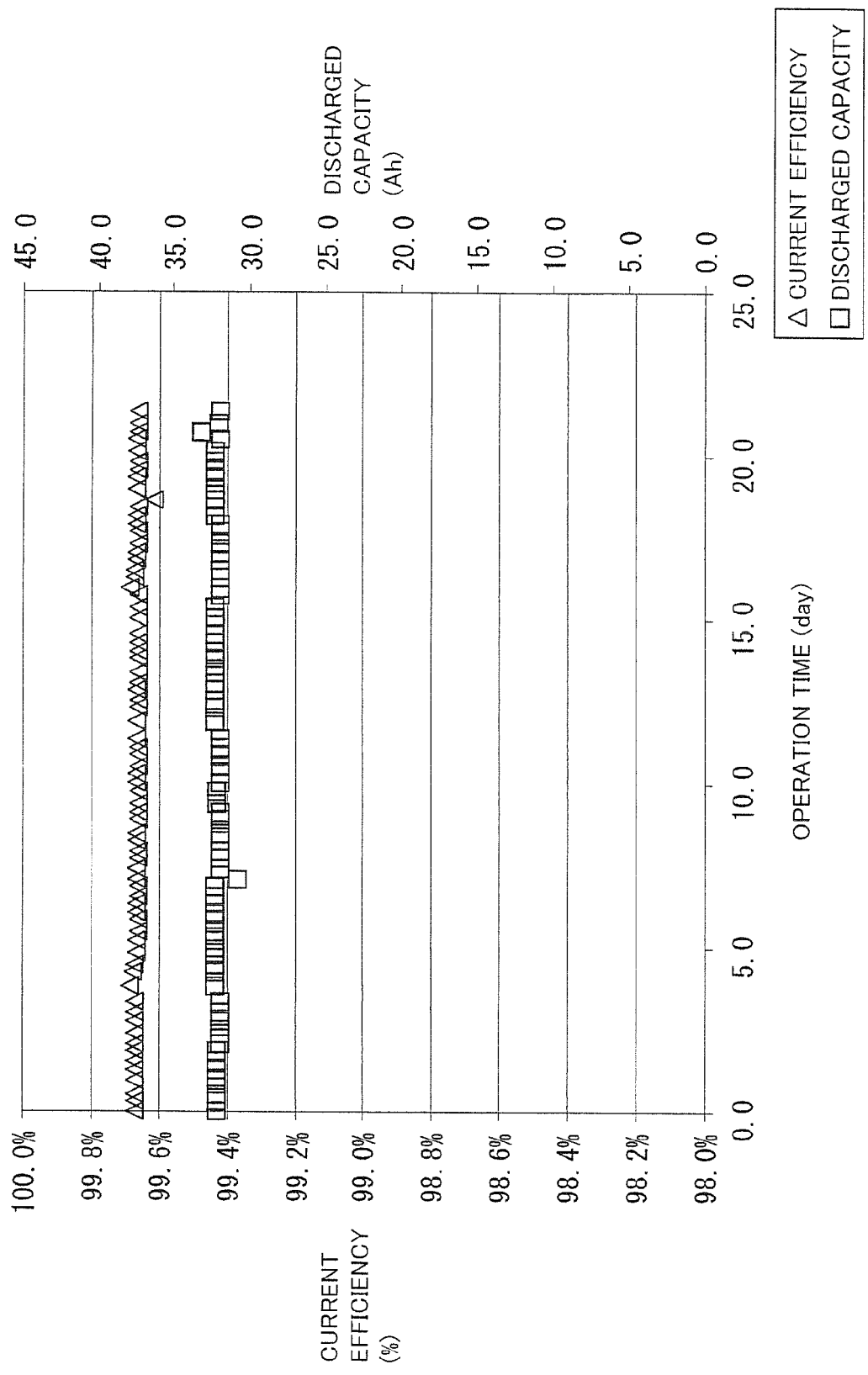
FIG. 14 shows a graph illustrating variation in current efficiency and variation in discharged capacity over time when charge and discharge was performed with positive and negative electrode electrolytes having the same composition, in a Ti/Mn-based redox flow battery manufactured in Experimental Example 11.

The above redox flow battery was charged and discharged with a constant current having a current density of 70 mA/cm$^2$ (switching voltage: 1.5V). FIG. 14 shows current efficiency and a discharged capacity during operation. The current efficiency, voltage efficiency and energy efficiency were determined in the same manner as Experimental Example 2. The discharged capacity (Ah) was determined from discharge time (h)×current (A) (current=current density×electrode area). As a result, the current efficiency was maintained at almost 99.7% and the discharged capacity was maintained at almost 32 Ah without substantial decrease after continued charge and discharge for about three weeks. In addition, the voltage efficiency was also constant at almost 85% since there was no significant variation in resistance, and thus the energy efficiency was also constant at almost 85% without substantial decrease. The reason for this result may be because the diffusion of the manganese ion and the titanium ion could be prevented by using the electrolytes having the same composition (electrolytes of both electrodes equal to each other in concentration of the same type of metal ion) as the electrolytes of both electrodes. The reason may also be because generation of a precipitation (solid) of $MnO_2$ could be effectively suppressed by the titanium ion at the positive electrode owing to a sufficiently high positive electrode Ti/positive electrode Mn, and because the discharged capacity could be increased owing to two-electron reaction. It can therefore be said that a Ti/Mn-based redox flow battery using electrolytes having the same manganese ion concentrations between positive and negative electrodes and the same titanium ion concentrations between positive and negative electrodes, or electrolytes having a higher titanium ion concentration than a manganese ion concentration in the positive electrode electrolyte can maintain excellent battery properties, namely, can have stable performance over a long period of time.

It should be noted that, if electrolytes having the same composition as described above are not used as the electrolytes of both electrodes at the start of operation, the ion concentrations in both electrolytes stored in both tanks can be measured as appropriate during use, and adjusted to equalize the concentrations of the manganese ion and the titanium ion at the positive electrode with the concentrations of the manganese ion and the titanium ion at the negative electrode, respectively. For example, the ion concentrations at both electrodes can be equalized with each other by mixing both electrolytes with each other. The mixing of both electrolytes can be done by constructing a system including a duct for connecting the tanks of both electrodes storing both electrolytes to each other, and an open/close valve provided on this duct capable of switching between connection and disconnection between both electrodes. By opening/closing the open/close valve as necessary, the electrolytes in both tanks can be readily mixed with each other via the ducts.

Experimental Example 12

The solubilities of a manganese ion (divalent) and a titanium ion (tetravalent) when both of them were dissolved in sulfuric acid ($H_2SO_4$) were examined.

Here, sulfuric acid aqueous solutions with varying sulfuric acid concentrations (M=mol/L) indicated in Table 4 were prepared, and manganese sulfate (divalent): $MnSO_4$ and titanium sulfate (tetravalent): $TiOSO_4$ were dissolved in the solutions. Table 4 and FIG. 15 show maximum concentrations of manganese ion concentration (M) and titanium ion concentration (M) that can be dissolved when both concentrations are equal to each other.

TABLE 4

| Sulfuric Acid Concentration (M) | Titanium Ion Concentration (M) | Manganese Ion Concentration (M) |
|---|---|---|
| 0.4 | 2 | 2 |
| 0.8 | 1.5 | 1.5 |
| 1.5 | 1.2 | 1.2 |
| 1.7 | 1.33 | 1.33 |
| 2 | 1.2 | 1.2 |
| 2.5 | 1 | 1 |
| 3 | 1 | 1 |

Figure 15:
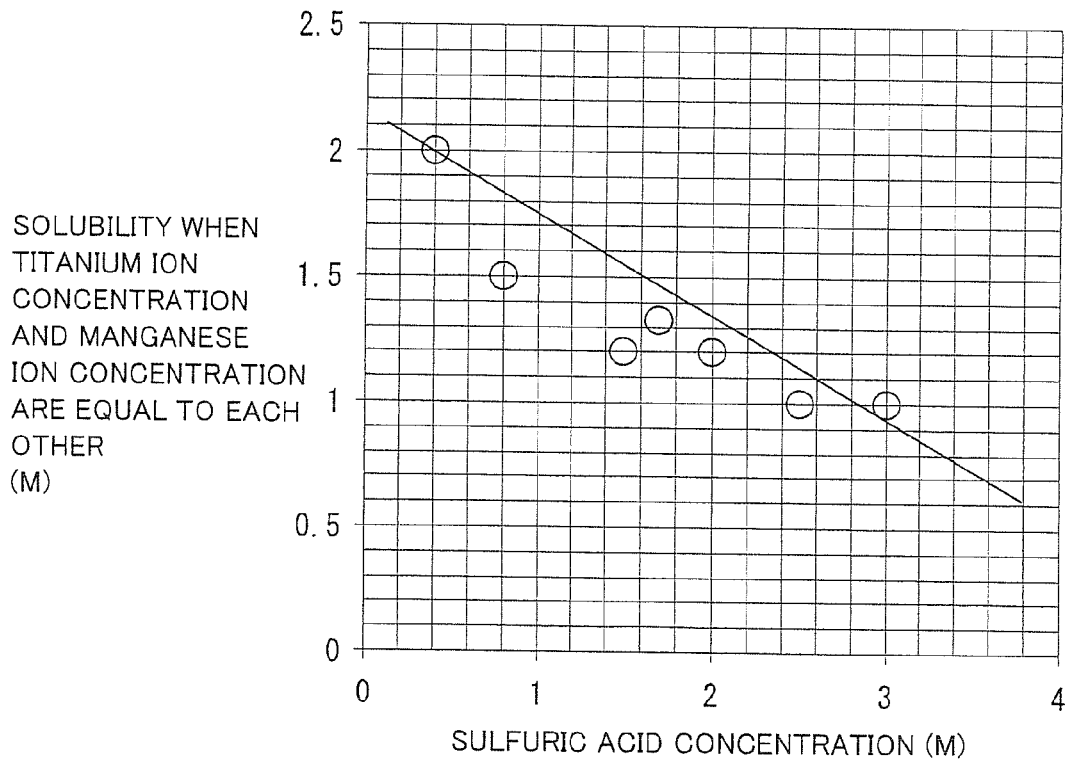
FIG. 15 shows a graph illustrating relation between sulfuric acid concentration (M) and the solubility of a manganese ion and a titanium ion (M).

As shown in Table 4 and FIG. 15, it can be seen that a solubility of not less than 1M of both of the manganese ion and the titanium ion can be ensured by setting the sulfuric acid concentration to not more than 3M. Thus, a solubility of not less than 0.3M which is considered to be a practical solubility can be sufficiently satisfied. It can also be seen that the solubilities of the manganese ion and the titanium ion decrease with an increase in sulfuric acid concentration.

Experimental Example 13

The redox flow battery system shown in FIG. 3 was structured, charged and discharged with electrolytes of both electrodes having a sulfuric acid concentration of 1M to 3M and manganese ion and titanium ion concentrations of 1M to 1.5M, and current efficiency, energy density and cell resistivity were examined.

Figure 16:
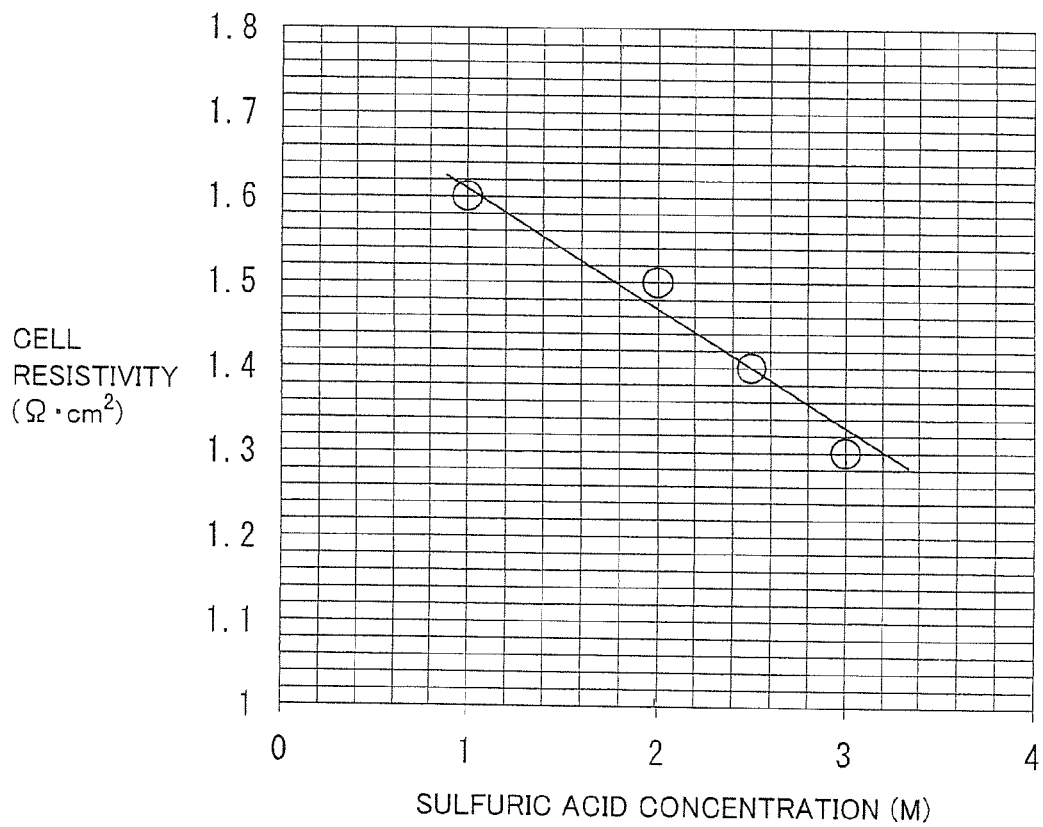
FIG. 16 shows a graph illustrating relation between sulfuric acid concentration (M) and cell resistivity ($\Omega \cdot cm^2$).

In this experiment, a small single-cell battery having the same specifications as those in Experimental Example 10 was structured except that electrolytes having various compositions were used as the electrolytes of both electrodes (membrane: anion exchange membrane, each electrode: carbon felt electrode, area of each electrode: 9 cm$^2$, amount of each electrolyte: 6 ml (6 cc)). The same composition was used for the electrolytes of both electrodes. Charge and discharge was performed with a constant current having a current density of 70 mA/cm$^2$ (switching voltage: 1.5V), and the above properties were examined. Table 5 shows the results. The current efficiency was determined in the same manner as Experimental Example 2. The energy density was calculated from discharge average voltage (V)×discharge time (h)×current value (A)÷electrolyte volume (m$^3$). The cell resistivity was determined from {(average terminal voltage during charge (V)−average terminal voltage during discharge (V))/(2×current density (A/cm$^2$))}. FIG. 16 shows relation between the cell resistivity (Ω·cm$^2$) and the sulfuric acid concentration (M).

TABLE 5

| Sample No. | Titanium Ion/ Manganese Ion/ Sulfuric Acid Concentration (M) | Volume Energy Density (kWh/m$^3$) | Current Efficiency | Cell Resistivity (Ω·cm$^2$) |
|---|---|---|---|---|
| 13-1 | 1.5/1.5/1 | 19.5 | 99.7% | 1.6 |
| 13-2 | 1.2/1.2/2 | 15.9 | 99.7% | 1.5 |
| 13-3 | 1/1/2.5 | 13.4 | 99.7% | 1.4 |
| 13-4 | 1/1/3 | 13.9 | 99.7% | 1.3 |

As indicated in Table 5 and Experimental Example 12 described above, it can be seen that the solubilities of the manganese ion and the titanium ion increase with a decrease in sulfuric acid concentration. However, as shown in Table 5 and FIG. 16, it can be seen that the cell resistivity decreases with an increase in sulfuric acid concentration. It can be said that the redox flow battery can have a low cell resistivity and a high energy density when the sulfuric acid concentration is 1M to 3M, and the titanium ion concentration and the manganese ion concentration in both electrolytes are 0.5 to 1.5M. Further, in consideration of a practically preferable cell resistivity (not more than 1.5 Ω·cm$^2$) and the size reduction of the system by increasing the energy density (namely, by increasing the solubilities of the manganese ion and the titanium ion), it can be said that the sulfuric acid concentration is preferably 1.5M to 2.5M, and the titanium ion concentration and the manganese ion concentration in both electrolytes are preferably 0.8 to 1.2M. By controlling the sulfuric acid concentration, the titanium ion concentration and the manganese ion concentration in both electrolytes to fall within specific ranges in this manner, the redox flow battery can have a more practical energy density and cell resistivity.

The embodiments described above can be modified as appropriate without departing from the scope of the present invention, and are not limited to the structures described above. For example, the manganese ion concentration and the titanium ion concentration in the positive electrode electrolyte, the acid concentration in the solvent for the positive electrode electrolyte, the type and concentration of the metal ion as the negative electrode active material, the type and concentration of the solvent in each electrolyte, the material of the electrodes, the material of the membrane and the like can be modified as appropriate.

INDUSTRIAL APPLICABILITY

The redox flow battery according to the present invention can be suitably used as a large-capacity storage battery for stabilizing variations in power generation output, storing surplus generated power, and load leveling for power generation of new energy such as solar photovoltaic power generation and wind power generation. The redox flow battery according to the present invention can also be suitably used as a large-capacity storage battery attached to a common power plant for voltage sag and power failure prevention and for load leveling. The method of operating a redox flow battery according to the present invention can be suitably used when using the redox flow battery according to the present invention in various applications described above.

REFERENCE SIGNS LIST

100 redox flow battery; 101 membrane; 102 positive electrode cell; 103 negative electrode cell; 104 positive electrode; 105 negative electrode; 106 tank for positive electrode electrolyte; 107 tank for negative electrode electrolyte; 108, 109, 110, 111 duct; 112, 113 pump; 200 control means; 201 input means; 202 charge time operation means; 203 storage means; 204 timer means; 205 SOC operation means; 206 determination means; 207 instruction means; 210 direct input means; 211 display means.

The invention claimed is:

1. A redox flow battery in which a positive electrode electrolyte and a negative electrode electrolyte are supplied to a battery cell including a positive electrode, a negative electrode, and a membrane interposed between the electrodes, to charge and discharge the battery, said positive electrode electrolyte containing a manganese ion, said negative electrode electrolyte containing at least one type of metal ion selected from a titanium ion, a vanadium ion, a chromium ion, a zinc ion, and a tin ion, said positive electrode electrolyte further containing a titanium ion as a precipitation suppression means for suppressing precipitation of MnO$_2$, and a concentration of the titanium ion in said positive electrode electrolyte being not less than 50% of a concentration of the manganese ion in said positive electrode electrolyte.

2. The redox flow battery according to claim 1, wherein both of said positive electrode electrolyte and said negative electrode electrolyte contain both of a manganese ion and a titanium ion.

3. The redox flow battery according to claim 1, wherein said negative electrode electrolyte contain a titanium ion, and a concentration of the titanium ion in said negative electrode electrolyte is equal to or higher than the concentration of the titanium ion in said positive electrode electrolyte.

4. The redox flow battery according to claim 2, wherein concentrations of the manganese ion and the titanium ion in said positive electrode electrolyte are equal to concentrations of the manganese ion and the titanium ion in said negative electrode electrolyte, respectively.

5. The redox flow battery according to claim 2, wherein both of said positive electrode electrolyte and said negative electrode electrolyte contain a sulfate anion, both of said positive and negative electrode electrolytes have a sulfuric acid concentration of not less than 1M and not more than 3M, both of said positive and negative electrode electrolytes have a manganese ion concentration of not less than 0.5M and not more than 1.5M, and both of said positive and negative electrode electrolytes have a titanium ion concentration of not less than 0.5M and not more than 1.5M.

6. The redox flow battery according to claim 1, wherein said membrane is an ion exchange membrane.

7. The redox flow battery according to claim 1, wherein both concentrations of the manganese ion and the titanium ion in said positive electrode electrolyte are not less than 0.3M and not more than 5M.

8. The redox flow battery according to claim 1, wherein the concentration of the manganese ion in said positive electrode electrolyte and the concentration of each metal ion in said negative electrode electrolyte are not less than 0.3M and not more than 5M.

9. The redox flow battery according to claim 1, wherein both of said positive electrode electrolyte and said negative electrode electrolyte contain a sulfate anion, and both of said positive and negative electrode electrolytes have a sulfuric acid concentration of less than 5M.

10. The redox flow battery according to claim 1, wherein said positive electrode electrolyte contains at least one type of manganese ion selected from a divalent manganese ion and a trivalent manganese ion, and a tetravalent titanium ion, and said negative electrode electrolyte satisfies any one of:

(1) containing at least one type of titanium ion selected from a trivalent titanium ion and a tetravalent titanium ion;

(2) containing at least one type of vanadium ion selected from a divalent vanadium ion and a trivalent vanadium ion;

(3) containing at least one type of chromium ion selected from a divalent chromium ion and a trivalent chromium ion;

(4) containing a divalent zinc ion; and (5) containing at least one type of tin ion selected from a divalent tin ion and a tetravalent tin ion.

11. The redox flow battery according to claim 1, wherein said positive electrode electrolyte contains at least one type of manganese ion selected from a divalent manganese ion and a trivalent manganese ion, tetravalent manganese, and a tetravalent titanium ion, and said negative electrode electrolyte satisfies any one of:

(I) containing at least one type of titanium ion selected from a divalent titanium ion, a trivalent titanium ion, and a tetravalent titanium ion;

(II) containing at least one type of vanadium ion selected from a divalent vanadium ion and a trivalent vanadium ion;

(III) containing at least one type of chromium ion selected from a divalent chromium ion and a trivalent chromium ion;

(IV) containing a divalent zinc ion; and (V) containing at least one type of tin ion selected from a divalent tin ion and a tetravalent tin ion.

12. The redox flow battery according to claim 1, wherein said positive electrode electrolyte further contains a trivalent chromium ion, and said negative electrode electrolyte contains a chromium ion and a divalent manganese ion.

13. The redox flow battery according to claim 2, wherein said positive electrode electrolyte contains at least one type of manganese ion selected from a divalent manganese ion and a trivalent manganese ion, and a tetravalent titanium ion, and said negative electrode electrolyte contains at least one type of titanium ion selected from a trivalent titanium ion and a tetravalent titanium ion, and a divalent manganese ion.

14. The redox flow battery according to claim 2, wherein said positive electrode electrolyte contains at least one type of manganese ion selected from a divalent manganese ion and a trivalent manganese ion, tetravalent manganese, and a tetravalent titanium ion, and said negative electrode electrolyte contains at least one type of titanium ion selected from a divalent titanium ion, a trivalent titanium ion, and a tetravalent titanium ion, and a divalent manganese ion.

15. The redox flow battery according to claim 1, wherein said positive electrode and said negative electrode are made of at least one type of material selected from a composite material including at least one type of metal selected from Ru, Ti, Ir, Mn, Pd, Au, and Pt, and an oxide of at least one type of metal selected from Ru, Ti, Ir, Mn, Pd, Au, and Pt, a carbon composite including said composite material, a dimensionally stable electrode (DSE) including said composite material, a conductive polymer, graphite, glassy carbon, conductive diamond, conductive diamond-like carbon (DLC), a nonwoven fabric made of carbon fiber, and a woven fabric made of carbon fiber, and said membrane is at least one type of membrane selected from a porous membrane, a swellable membrane, a cation exchange membrane, and an anion exchange membrane.

16. The redox flow battery according to claim 1, wherein a solvent for each of said positive and negative electrode electrolytes is an aqueous solution of at least one species selected from $H_2SO_4$, $K_2SO_4$, $Na_2SO_4$, $H_3PO_4$, $K_2PO_4$, $Na_3PO_4$, $K_3PO_4$, $H_4P_2O_7$, $HNO_3$, $KNO_3$, and $NaNO_3$.

17. A method of operating the redox flow battery according to claim 2, comprising the step of equalizing concentrations of the manganese ion and the titanium ion in said positive electrode electrolyte with concentrations of the manganese ion and the titanium ion in said negative electrode electrolyte, respectively, by mixing said positive electrode electrolyte and said negative electrode electrolyte with each other.

* * * * *